US012245269B1

(12) United States Patent
Taherzadeh Boroujeni et al.

(10) Patent No.: US 12,245,269 B1
(45) Date of Patent: *Mar. 4, 2025

(54) METHODS AND APPARATUS FOR UPLINK (UL) MULTIPLEXING AND PRIORITIZATION IN NEW RADIO (NR) COMMUNICATION

(71) Applicant: InterDigital Patent Holdings, Inc., Wilmington, DE (US)

(72) Inventors: Mahmoud Taherzadeh Boroujeni, San Diego, CA (US); Oghenekome Oteri, San Diego, CA (US); Shahrokh Nayeb Nazar, San Diego, CA (US); Faris Alfarhan, Montreal (CA); Paul Marinier, Brossard (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/934,998

(22) Filed: Nov. 1, 2024

Related U.S. Application Data

(63) Continuation of application No. 17/607,128, filed as application No. PCT/US2020/030648 on Apr. 30, 2020.

(Continued)

(51) Int. Cl.
*H04W 72/566* (2023.01)
*H04W 72/0446* (2023.01)
(Continued)

(52) U.S. Cl.
CPC ..... *H04W 72/569* (2023.01); *H04W 72/0446* (2013.01); *H04W 72/0453* (2013.01);
(Continued)

(58) Field of Classification Search
CPC ........... H04W 72/569; H04W 72/0446; H04W 72/0453; H04W 72/1263; H04W 72/20;
(Continued)

(56) References Cited

U.S. PATENT DOCUMENTS

| 10,524,244 B2 | 12/2019 | Tsai et al. |
| 2017/0208590 A1 | 7/2017 | Kim et al. |

(Continued)

FOREIGN PATENT DOCUMENTS

| CN | 107888338 A | 4/2018 |
| CN | 109588057 A | 4/2019 |

(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11 ac-2013 (Dec. 11, 2013, 425 pages).

(Continued)

*Primary Examiner* — Ashley Shivers
(74) *Attorney, Agent, or Firm* — Flaster Greenberg, P.C.

(57) ABSTRACT

A wireless transmit/receive unit (WTRU) may receive a first higher layer configuration for a cancellation indication (CI). Further, the first higher layer configuration may include a set of reference frequency resources. Also, the WTRU may receive a grant indicating a frequency allocation and a time allocation for a scheduled transmission. Further, on a condition that the CI is received, the WTRU may interrupt the scheduled transmission. Additionally, the CI may indicate a subset of frequency resources of the set of reference frequency resources for each of a set of time symbols. Also, the (Continued)

WTRU may cancel the scheduled transmission on a condition that the subset of frequency resources of a set of time symbols overlaps with the frequency allocation and the time allocation for the scheduled transmission. In a further example, the first higher layer configuration may include an applicable maximum priority and the grant may include a priority index.

20 Claims, 22 Drawing Sheets

Related U.S. Application Data

(60) Provisional application No. 62/886,173, filed on Aug. 13, 2019, provisional application No. 62/841,021, filed on Apr. 30, 2019.

(51) Int. Cl.
    *H04W 72/0453*      (2023.01)
    *H04W 72/1263*      (2023.01)
    *H04W 72/20*      (2023.01)
    *H04W 72/23*      (2023.01)
    *H04W 72/56*      (2023.01)

(52) U.S. Cl.
    CPC ....... *H04W 72/1263* (2013.01); *H04W 72/20* (2023.01); *H04W 72/23* (2023.01); *H04W 72/56* (2023.01)

(58) Field of Classification Search
    CPC .... H04W 72/23; H04W 72/56; H04L 5/0053; H04L 5/0094
    See application file for complete search history.

(56) References Cited

U.S. PATENT DOCUMENTS

| | | |
|---|---|---|
| 2019/0261247 A1 | 8/2019 | Wang et al. |
| 2020/0229202 A1 | 7/2020 | Bagheri et al. |
| 2020/0259601 A1 | 8/2020 | Zhou et al. |
| 2020/0344747 A1 | 10/2020 | Park |
| 2020/0374909 A1 | 11/2020 | Takeda et al. |
| 2021/0392664 A1 | 12/2021 | Alabbasi et al. |

FOREIGN PATENT DOCUMENTS

| | | |
|---|---|---|
| EP | 3528515 A1 | 8/2019 |
| WO | WO 2014/027768 A1 | 2/2014 |
| WO | WO 2016112131 A1 | 7/2016 |
| WO | WO 2016/182291 A1 | 11/2016 |
| WO | WO 2018064128 A1 | 4/2018 |
| WO | WO 2018082686 A1 | 5/2018 |
| WO | WO 2019030870 A1 | 2/2019 |

OTHER PUBLICATIONS

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016, 594 pages).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016, 3534 pages).
LG Electronics, "Discussion on UL Inter UE Tx Prioritization," 3GPP TSG RAN WG1 #96, R1-1904631, Athens, Greece (Feb. 25-Mar. 1, 2019, 6 pages).
NEC, "Enhanced Inter-UE Tx Prioritization and Multiplexing," 3GPP TSG RAN WG1 #96bis, R1-1904224, Xi'an, China (Apr. 8-12, 2019, 4 pages).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 11, 2009, 536 pages).
Third Generation Partnership Project, "Technical Specification Group Radio Access Network; NR; Multiplexing and Channel Coding (Release 16)," 3GPP TS 38.212 V16.1.0, Valbone, France, (Mar. 2020, 146 pages).
Third Generation Partnership Project, "Technical Specification Group Radio Access Network; NR; Physical Channels and Modulation (Release 16)," 3GPP TS 38.211 V16.1.0, Valbone, France, (Mar. 2020, 130 pages).
Third Generation Partnership Project, "Technical Specification Group Radio Access Network; NR; Radio Resource Control (RRC) Protocol Specification (Release 16)," 3GPP TS 38.331 V16.0.0 (Mar. 2020, 835 pages).
Third Generation Partnership Project, "Technical Specification Group Radio Access Network; NR; Physical Layer Procedures for Control (Release 16)," 3GPP TS 38.213 V16.1.0 (Mar. 2020, 156 pages).
Third Generation Partnership Project, "Technical Specification Group Radio Access Network; NR; Multiplexing and Channel Coding (Release 15)," 3GPP TS 38.212 V15.8.0 (Dec. 2019, 101 pages).
Third Generation Partnership Project, "Technical Specification Group Radio Access Network; NR; Physical Layer Procedures for Control (Release 15)," 3GPP TS 38.213 V15.9.0 (Mar. 2020, 109 pages).
Third Generation Partnership Project, "Technical Specification Group Radio Access Network; NR; Physical Channels and Modulation (Release 15)," 3GPP TS 38.211 V15.8.0 (Dec. 2019, 227 pages).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013, 198 pages).
InterDigital Inc., "Enhanced Inter UE Transmit Prioritization/Multiplexing for eURLLC," 3GPP TSG RAN WG1 #98, R1-1909453, Prague, Czech (Aug. 26-30, 2019, 7 pages).
InterDigital Inc., "Enhanced Inter UE Transmit Prioritization/Multiplexing for eURLLC," 3GPP TSG RAN WG1 #98bis, R1-1911337, Chongqing, China (Oct. 14-20, 2019, 6 pages).
InterDigital Inc., "On Enhanced Inter UE Tx Prioritization/Multiplexing for eURLLC," 3GPP TSG RAN WG1 #97, R1-1907108, Reno, USA (Apr. 13-17, 2019, 4 pages).
Third Generation Partnership Project, "Technical Specification Group Radio Access Network; NR; Multiplexing and Channel Coding (Release 15)," 3GPP TS 38.212 V15.5.0 (Mar. 2019, 17 pages).
Third Generation Partnership Project (3GPP), "Physical Channels and Modulation", Technical Specification Group Radio Access Network; NR, Release 15, 3GPP TS 38.211 V15.5.0, (Mar. 2019, 96 pages).
Third Generation Partnership Project (3GPP), "Summary of UL Inter UE tx Prioritization/Multiplexing", Vivo, 3GPP TSG RAN WG1 Meeting #96bis, R1-1905598, Xi'an, China, (Apr. 8-12, 2019, 25 pages).
"UL Inter-UE Tx Prioritization for URLLC," Vivo, 3GPP TSG RAN WG1 #96bis, R1-1904224, Xi'an, China (Apr. 3, 8-12, 2019, 12 pages).
Third Generation Partnership Project, "Technical Specification Group Radio Access Network; NR; Radio Resource Control (RRC) Protocol Specification (Release 15)," 3GPP TS 38.331 V15.5.1 (Apr. 2019, 491 pages).
Third Generation Partnership Project (3GPP), "Physical Layer Procedures for Control", Technical Specification Group Radio Access Network; NR, Release 15, 3GPP TS 38.213 V15.5.0, (Mar. 2019, 104 pages).
Third Generation Partnership Project (3GPP), "DCI design for URLLC", Huawei, HiSilicon, R1-1904693, (Apr. 8-12, 2019, 7 pages).

(56) References Cited

OTHER PUBLICATIONS

"UL Inter-UE Tx Prioritization for URLLC", Vivo, 3rd Generation Partnership Project (3GPP) R1-1904085, vol. RAN WG1, No. Xi'an, China, (Apr. 3, 2019).

METHODS AND APPARATUS FOR UPLINK (UL) MULTIPLEXING AND PRIORITIZATION IN NEW RADIO (NR) COMMUNICATION

CROSS-REFERENCE TO RELATED APPLICATIONS

This application is a continuation of U.S. Non-Provisional patent application Ser. No. 17/607,128, filed Oct. 28, 2021, which is a National Stage entry under 35 U.S.C. § 371 of Patent Cooperation Treaty Application PCT/US2020/030648, filed Apr. 30, 2020, which claims the benefit of U.S. Provisional Application No. 62/841,021, filed Apr. 30, 2019, and U.S. Provisional Application No. 62/886,173, filed Aug. 13, 2019, the contents of which are incorporated herein by reference.

BACKGROUND

In New Radio (NR) for fifth generation (5G) wireless systems, a new structure and design is adopted for a physical uplink control channel (PUCCH) for transmitting uplink data, as well as its scheduling via the physical downlink control channel (PDCCH). In NR, for data transmission, a transport block (TB) is a unit of data transmission consisting of one or multiple code blocks (CBs).

A CB is a part of data that is associated with one block of error correction code and one cyclic redundancy check (CRC). A code block group (CBG) is a group of CBs that are associated with a single bit for acknowledgement (ACK)-negative acknowledgement (NACK). One TB may consist of multiple CBGs. The maximum of number CBGs per TB may be configured by higher layer signaling.

Further, a wireless system may include different use cases such as services relying on ultra-reliable low latency (URLLC) access. Also, use cases may include services relying on enhanced massive mobile broadband (eMBB) access.

SUMMARY

Methods and apparatus for uplink (UL) multiplexing and prioritization involving cancellation, interruption, or preemption. In an example, a wireless transmit/receive unit (WTRU) may receive a first higher layer configuration for a cancellation indication (CI). Further, the first higher layer configuration may include a set of reference frequency resources. Also, the WTRU may receive a grant indicating a frequency allocation and a time allocation for a scheduled transmission. Further, on a condition that the CI is received, the WTRU may interrupt the scheduled transmission. In an example, the CI may indicate a subset of frequency resources of the set of reference frequency resources for each of a set of time symbols. Also, the WTRU may cancel the scheduled transmission on a condition that the subset of frequency resources of a set of time symbols overlaps with the frequency allocation and the time allocation for the scheduled transmission.

In examples, the grant may include at least one of downlink control information (DCI), a dynamic grant, a configured grant, radio resource control (RRC) signaling, or a second higher layer configuration. Further, the grant may include a priority index or a priority indication for the scheduled transmission and the scheduled transmission may be interrupted on a further condition that the priority index for the scheduled transmission is determined to be lower than an applicable maximum priority. Also, the first higher layer configuration may include the applicable maximum priority. In addition, the first higher layer configuration may include a first indication. Also, the determination that the priority index of the transmission is lower than an applicable maximum priority may be based on the first indication.

Further, the first higher layer configuration may include a second indication. Also, the scheduled transmission may be interrupted based on the second indication. Moreover, the CI may include the applicable maximum priority.

Also, on a condition that the priority index indicates a priority lower than or the same as the applicable maximum priority, the WTRU may begin transmitting the scheduled transmission as a low priority transmission. Further, on a condition that the priority index indicates a priority lower than or the same as the applicable maximum priority, the WTRU may monitor for the CI. Moreover, on a condition that the priority index indicates a priority higher than the applicable maximum priority, the WTRU may begin transmitting the scheduled transmission as a high priority transmission.

In another example, the scheduled transmission may be for transmission on a physical uplink control channel (PUCCH). In an additional example, the scheduled transmission may be for transmission on a physical uplink shared channel (PUSCH). In addition, the scheduled transmission may be an ultra-reliable low latency (URLLC) transmission. Moreover, the scheduled transmission may be an enhanced massive mobile broadband (eMBB) transmission.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
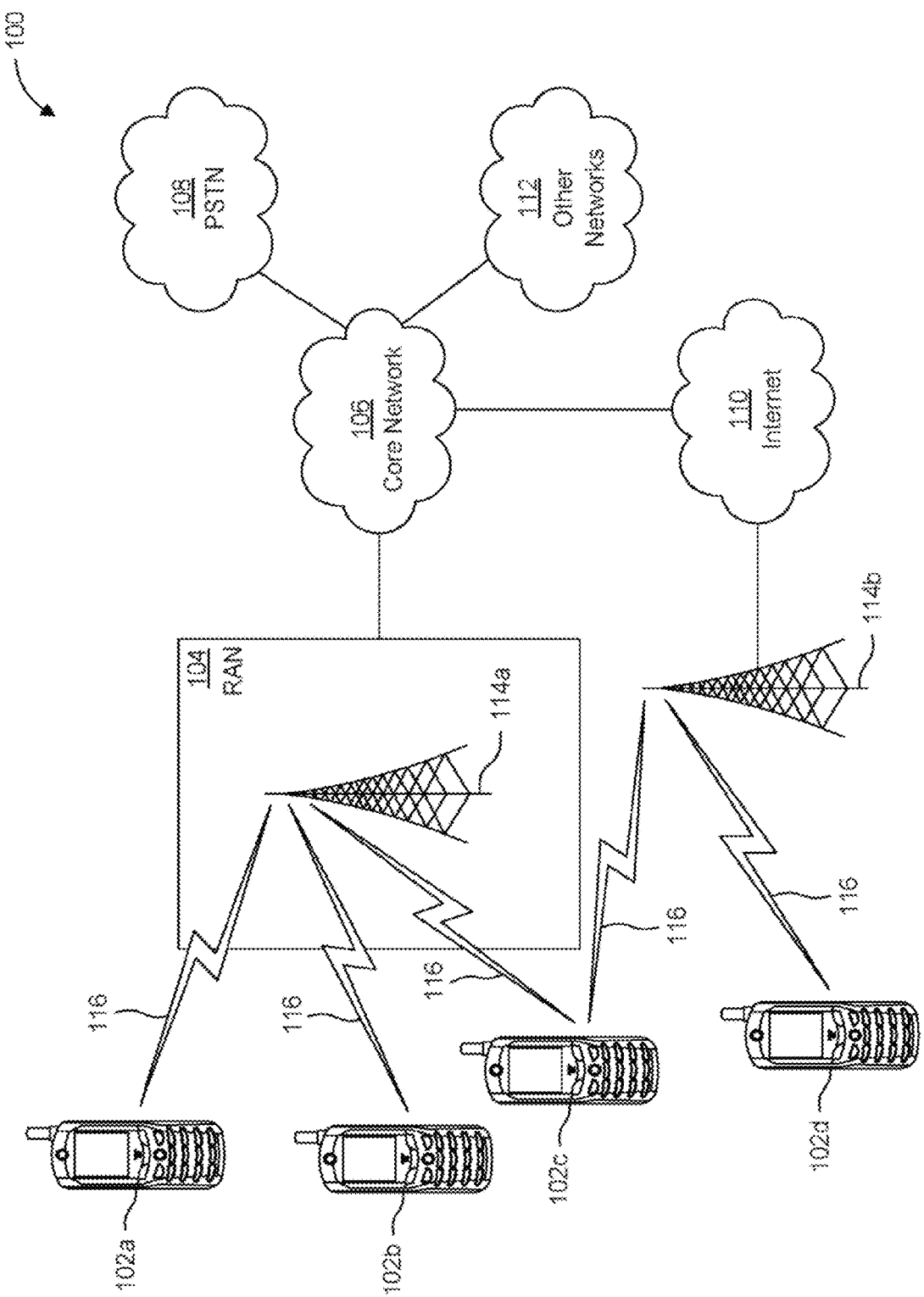
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (for example, radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (for example, an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (for example, for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (for example, WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (for example, the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
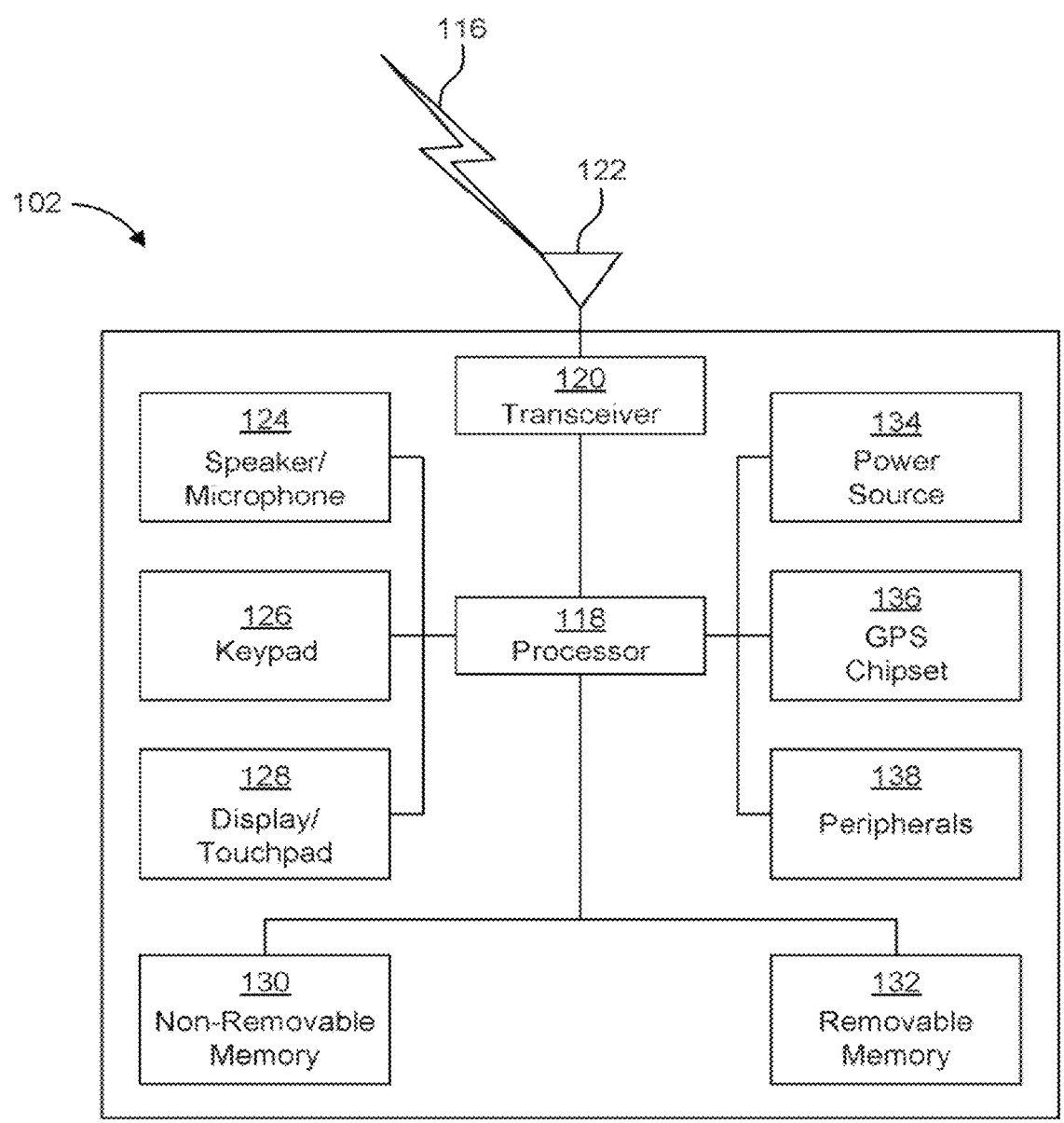
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (for example, associated with particular subframes for both the UL (for example, for transmission) and DL (for example, for reception) may be concurrent and/or simultaneous. The full duplex radio may include an interference management unit to reduce and or substantially eliminate self-interference via either hardware (for example, a choke) or signal processing via a processor (for example, a separate processor (not shown) or via processor 118). In an embodiment, the WTRU 102 may include a half-duplex radio for which transmission and reception of some or all of the signals (for example, associated with particular subframes for either the UL (for example, for transmission) or the DL (for example, for reception).

Figure 1C:
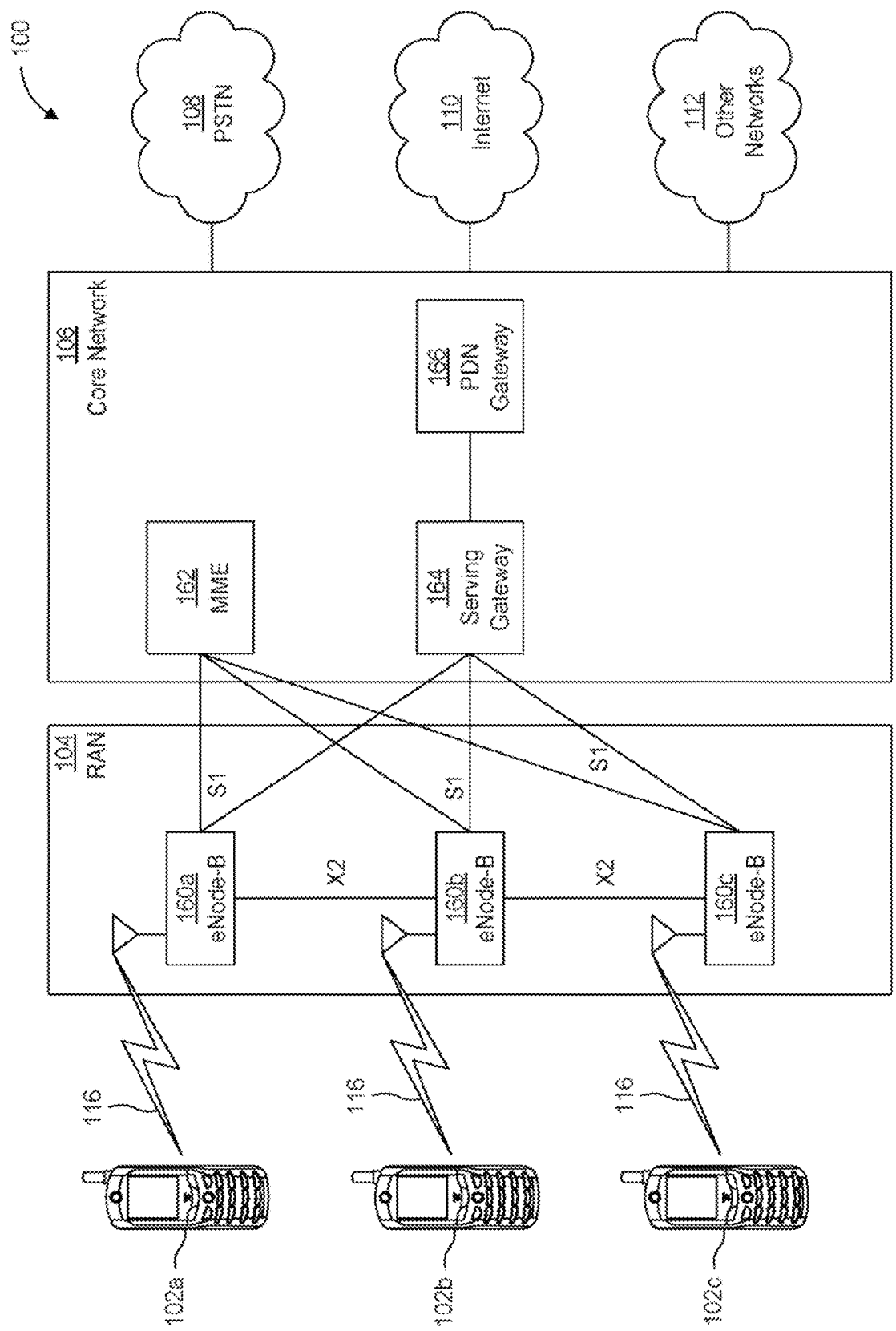
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (for example, temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (for example, directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (for example, all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (for example, 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (for example, every STA), including the AP, may sense the primary channel. If the primary channel is sensed/detected and/or determined to be busy by a particular STA, the particular STA may back off. One STA (for example, only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (for example, only support for) certain and/or limited bandwidths. The MTC devices may include a battery with a battery life above a threshold (for example, to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (for example, MTC type devices) that support (for example, only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
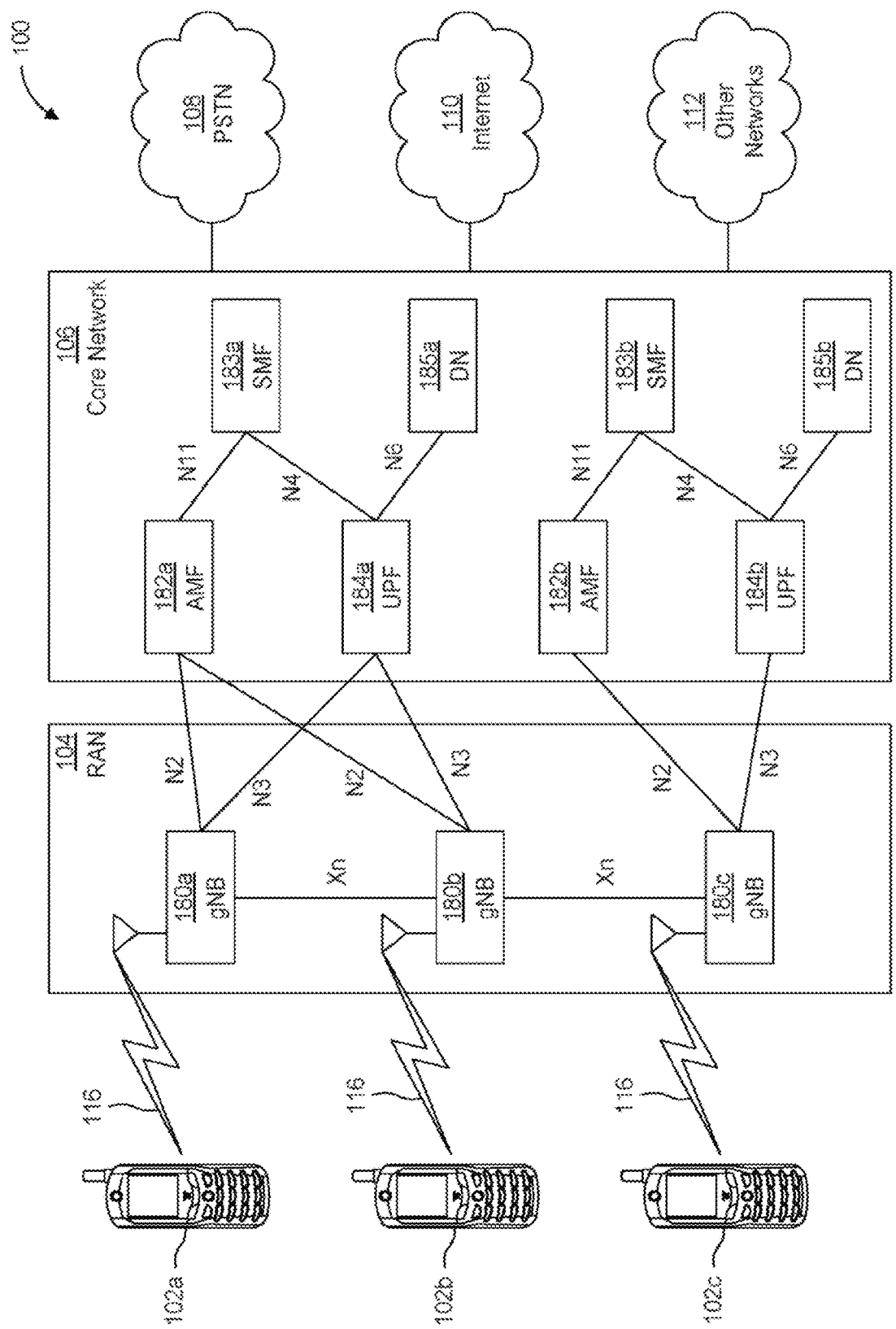
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (for example, containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (for example, such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (for example, handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (for example, testing) wired and/or wireless communication network in order to implement testing of one or more components. The one or more emulation devices may be test equipment. Direct RF coupling and/or wireless communications via RF circuitry (for example, which may include one or more antennas) may be used by the emulation devices to transmit and/or receive data.

In NR, for data transmission, a transport block (TB) is a unit of data transmission consisting of one or multiple code blocks CBs. A CB is a part of data that is associated with one block of error correction code and one cyclic redundancy check (CRC). A code block group (CBG) is a group of CBs that are associated with a single bit for acknowledgement (ACK)-negative acknowledgement (NACK). One transport block may consist of multiple CBGs. The maximum of number CBGs per TB may be configured by higher layer signaling.

In NR and LTE, data transmission is generally scheduled dynamically by a gNB using downlink control information (DCI) which is transmitted by a physical downlink control channel (PDCCH). The time domain assignment for a physical uplink shared channel (PUSCH) may be scheduled by DCI as in the following.

The starting symbol S relative to the start of the slot, and the number of consecutive symbols L counting from the symbol S allocated for the PUSCH are determined from the start and length indicator SLIV of the indexed row:

if $(L-1) \leq 7$ then  Equation 1

$SLIV = 14 \cdot (L-1) + S$  Equation 2 else $SLIV = 14 \cdot (14-L+1) + (14-1-S)$  Equation 3 where $0 < L \leq 14-S$.  Equation 4

In 5G NR, downlink preemption procedure is specified as the following. If a WTRU is provided with higher layer parameter DownlinkPreemption, the WTRU is configured with an interruption radio network temporary identifier (INT-RNTI) provided by higher layer parameter int-RNTI for monitoring a PDCCH conveying DCI format 2_1.

The WTRU may be additionally configured with a set of serving cells by higher layer parameter INT-ConfigurationPerServingCell that includes a set of serving cell indexes provided by corresponding higher layer parameters servingCellII and a corresponding set of locations for fields in DCI format 2_1 by higher layer parameter positionInDCI. Also, an information payload size for DCI format 2_1 by higher layer parameter dci-PayloadSize may be configured. Further, the WTRU may be additionally configured with an indication granularity for time-frequency resources by higher layer parameter timeFrequencySet.

The content of the DCI carrying the "downlink preemption indication" indicates the frequency and the time of the preempted resources, including the corresponding symbols.

IN R15 power control, the PUSCH received power may be estimated as shown in Table 1.

TABLE 1

PUSCH_Rx_power = min (pmax, Po(j) + a(j)PL(q) + 10 log10($2^u$ M) + delta_TF + delta_f (I)
  PL (q): path loss estimate from CSI-RS or SSBlock: q is per beam pair with a maximum of 4 beam pairs tracked TABLE 1-continued Po (j): target received power:
a (j): fractional path loss compensation factor 0 < a < 1:
Prx = Po + a PL − PL
a = 1, Prx = Po: pure power control for example CDMA, cell edge interference to OBSS high
a = 0, Prx = Po − PL : no power control
0 < a < 1: Prx = Po + a PL − PL : fractional path-loss compensation, balance TPC out-of-cell interference
Po and a are open loop parameters indexed by j.
   J tracks the types of transmissions: message-3 RACH (0) {a = 1}, grant free PUSCH (1) and grant based PUSCH
   Note that j is indexed on the SRI (q) i.e. beam based
$2^u$ M: multiplied by number of RBs and scaled by the numerology (15 KHz = 0)
delta_TF: Transport format factor that varies by number of information bits per resource element = 10 log($2^{1.25\ gamma} - 1$) beta : 80% of Shannon capacity.
   Beta: used if PUSCH carries L1 control
   gamma: number of information bits in PUSCH transmission/(Totol_REs − DMRS_REs).
   Used for single layer transmission and if there is no fractional power control.
delta_f: closed loop power control carried in TPC field in DCI 0-0 and 0-1 or 202.
   2 bits: −1 dB, 0 dB, +1 dB +3 dB
Pucch: same as PUSCH but a = 1 and carried in DL control DCI 1-0 and 1-1

In fifth generation (5G) NR, new enhancements are needed to improve the reliability of URLLC UL transmission. One of these enhancements is the option of cancelling eMBB UL data transmission, when a URLLC WTRU needs the resources.

The new enhancements and modifications described herein, address several problems. These enhancements and modifications may be used separately or in any combination with each other.

In a problem, in NR, a physical uplink control channel (PUCCH) is used by the WTRU for transmission of critical feedback information, such as, for example, a hybrid automatic repeat request-acknowledgement (HARQ-ACK), a scheduling request (SR), and the like to a base station, such as a gNB. In case an eMBB WTRU is configured with UL cancellation, the eMBB WTRU may need to cancel a UL transmission including a PUCCH on time-frequency resources which overlap with UL transmissions from a URLLC WTRU. If the PUCCH is canceled, the eMBB WTRU may not be able to transmit a SR to request a UL grant from a gNB or transmit the HARQ-ACK corresponding to a received PDSCH. In the latter case, the gNB cannot assume that the eMBB WTRU has correctly detected the DL packet transmitted in the corresponding PDSCH, and therefore the gNB may need to retransmit the DL packet which results in system throughput loss. Accordingly, a mechanism is needed to make sure the eMBB WTRU which is configured with UL cancellation would be able to transmit essential feedback in the UL.

In another problem, in inter-UE eMBB and URLLC multiplexing, the gNB may send a cancellation indication, for example, an indication sent in a PDCCH, to the eMBB WTRU in order to cancel its transmission for a duration and send a scheduling indication, for example, a DCI transmitted in a WTRU-specific DCI, to the URLLC WTRU to use the cancelled resources. For example, the indication may be sent in a GC-PDDCH. In a further example, the indication may be sent in a PDCCH for a DCI format 2_4 with CRC scrambled by CI-RNTI. The success or failure of the WTRUs in decoding either the cancellation indication or the scheduling indication may impact the performance of the URLLC transmission. In the case that there is a failure to decode one or more of the indications, methods are needed to enable recovery of the URLLC WTRU transmission especially in the case that the latency requirements are very stringent. The failure to decode one or more of the indications may be the failure in decoding of either the cancellation indication, such as by the eMBB WTRU, or the scheduling indication, such as by the URLLC WTRU.

Another problem is how to design an efficient cancellation procedure and how to signal it to eMBB users without using excessive control resources and with a good trade-off between the signaling overhead and the scheduling flexibility. A related problem is how the WTRU could monitor the cancellation indication timely without consuming considerable power. Furthermore, given the cancellation indication can be indicated on a GC-PDCCH signal, how could the eMBB WTRU determine that the indication is applicable to it, and how could the URLLC WTRU determine that the cancellation indication is not applicable to it.

Another problem is how to support inter-WTRU uplink multiplexing/prioritization, when the URLLC WTRU is using grantless UL transmission or UL with a configured grant. In this case, a UL cancellation indication may not be feasible at the beginning, because the gNB is not aware of the UL transmission from the URLLC WTRU until it detects it.

Another problem is how to generalize UL multiplexing/prioritization for UL transmission using an alternative to the PUSCH, for example a physical random access channel (PRACH), a sounding reference signal (SRS) or both. To apply UL multiplexing/prioritization to other channels, the main question is how to design efficient procedures that provide the added scheduling flexibility without excessive changes in the 5G NR systems or specifications.

In another problem, when a carrier is configured in unmodified time-division duplex (TDD) mode, the WTRU is only capable of either transmitting (uplink) or receiving (downlink) on a given time slot. For an eMBB WTRU, receiving a cancellation indication while transmitting uplink data on the same carrier becomes not possible. A problem is how to indicate to the WTRU the uplink cancellation indication when the carrier is configured in TDD mode. A related problem includes how a cancellation indication can indicate a cancellation on a different carrier than the one used to receive the indication.

In another problem, it has been shown that when using enhanced UL power control for UL inter-WTRU transmission prioritization/multiplexing, enhanced dynamic power boosting for an URLLC WTRU, including dynamic change of power control parameters, for example, P0 and alpha without scheduling request indicator (SRI) configured, and enhanced transmit power command (TPC), for example, increased TPC range and finer granularity, may offer benefits. Note that the need of URLLC WTRU power change during one transmission instance has not be considered and it is assumed that there is no change of an eMBB WTRU power control scheme. Further benefits, such as, for example, no losses, have been observed when the gNB uses a successive interference cancellation (SIC) receiver to separate the transmission. This may require that the channel estimate of both the eMBB WTRU and the URLLC WTRU be clean. In this case, methods are needed to ensure that a demodulation reference symbol (DMRS), or multiple DMRSs, can be separated with little or no interference.

In the following, a reference symbol may be used to denote a symbol such as a complex number that is fixed, known and used as a pilot. A reference signal may be used to denote the time domain signal that is generated after processing the reference symbols. For example, in OFDM, the reference symbols are the complex numbers that are fed into the inverse discrete Fourier transform (IDFT) block while the reference signal is the output of the IDFT block. In NR, a slot may be a unit in the time grid that includes 14 OFDM symbols. DCI may be a set of bits that are transmitted over a PDCCH for a user or a group of users. A resource element (RE) may be one OFDM symbol on one subcarrier, and a resource element group (REG) may refer to a group of REs used as building blocks of a control channel element (CCE) which may assign resource elements to a user. Adjacent REGs in time or frequency that are grouped together and have the same associated precoder may be called REG bundles.

Further, NR-REG, NR-CCE, and NR-PDCCH refer to REG, CCE, and PDCCH for NR in 5G. WTRU and user may be used interchangeably, referring to the same thing and still be consistent with examples provided herein. Also, base station, gNodeB and gNB may be used interchangeably, referring to the same thing and still be consistent with examples provided herein. A control resource set (CORESET) may be a set of resource elements used for downlink control channel, configured by its frequency resources and its length in time and the type of its REG bundles. A CORESET length in time may be expressed in terms of symbols. A search space, or a set of search spaces, may be a set of PDCCH candidates that are monitored by a WTRU or a group of WTRUs during blind detection of a PDCCH. A Code Block (CB) may be a part of data that is associated with one block of error correction code and one CRC. Also, a Code Block group (CBG) may be a group of CBs that are associated with a single bit for ACK-NACK. A transport Block (TB) may be a unit of data transmission consisting of one or multiple CBs. Also, a start and length indicator value (SLIV) may be a parameter that is used for time domain allocation of data transmission.

The following embodiments, examples and solutions describe methods for PUCCH cancellation which may be a solution to the problems described above. These method may be used individually or in any combination with each other.

One approach to enhance the reliability, latency or both of UL transmission for URLLC users may be that the scheduler provides a UL grant or configures PUCCH resources for the URLLC WTRUS which overlap with the time-frequency resources that are assigned for UL transmission by the eMBB WTRUs. In examples, the scheduler may be located at the base station or deeper in the network.

In one example, the eMBB WTRUs may receive an indication to cancel uplink control information (UCI) transmission on the configured or dynamically indicated PUCCH resources which entirely or partially overlap with the time-frequency resources configured for UL transmission by the URLLC WTRUs. The indication may be sent implicitly or explicitly.

In another embodiment, the eMBB WTRUs which are subject to UL cancellation may be configured with two, or more, PUCCH resource sets for each range of UCI information bits $O_{UCI}$ payload. In examples, the range may include $O_{UCI} \leq 2$, $2 < O_{UCI} \leq N_2$, $N_2 < O_{UCI} \leq N_3$, $N_3 < O_{UCI} \leq 1706$ bits where $N_2$ & $N_3$ are provided by a higher layer. Further a primary PUCCH resource set may be used by the WTRU for UCI transmission during normal operation with no UL cancellation. Also, a secondary PUCCH resource set may be used by the WTRU for UCI.

In one example method, if an eMBB WTRU detects an indication that the transmission from the WTRU should be cancelled on certain physical resource blocks (PRBs) and in symbols, then the WTRU may determine whether the indicated UL resources subject to cancellation overlap with the primary PUCCH resource set. The indication may be sent implicitly or explicitly.

If the case is that resources overlap, the WTRU may refrain from UCI transmission on the PUCCH resource which belongs to the primary PUCCH resource set. In an example, such a refrain from UCI transmission may be PUCCH cancellation. Then, the WTRU may transmit UCI on the PUCCH resource which belongs to the secondary PUCCH resource set. Additionally or alternatively, the WTRU may multiplex UCI with data and transmit on a grant-based PUSCH resource. Or, in case the WTRU does not have a UL grant, the WTRU may use a configured PUSCH resource which does not overlap with the indicated UL resources subject to cancellation for transmission of both data and UCI. In an example, the configured PUSCH resource may be a grant-free UL resource.

In another example in an embodiment, an eMBB WTRU which is configured for UL cancellation may determine a PUCCH format based on the overlap pattern between the PUCCH resources and the indicated PRBs and symbols over which the UL transmission is to be cancelled by the WTRU. According to this method, the WTRU may do any of the following three actions, including any combination of the actions.

First, the WTRU may determine whether the indicated UL resources subject to cancellation overlap with the primary PUCCH format from a first set of PUCCH resources. Second, the WTRU may determine a secondary PUCCH format from a second set of PUCCH resources which does not overlap with the indicated UL resources subject to cancellation. Third, the WTRU may Transmit the UCI on the secondary PUCCH format from a secondary set of PUCCH resources.

Figure 2:
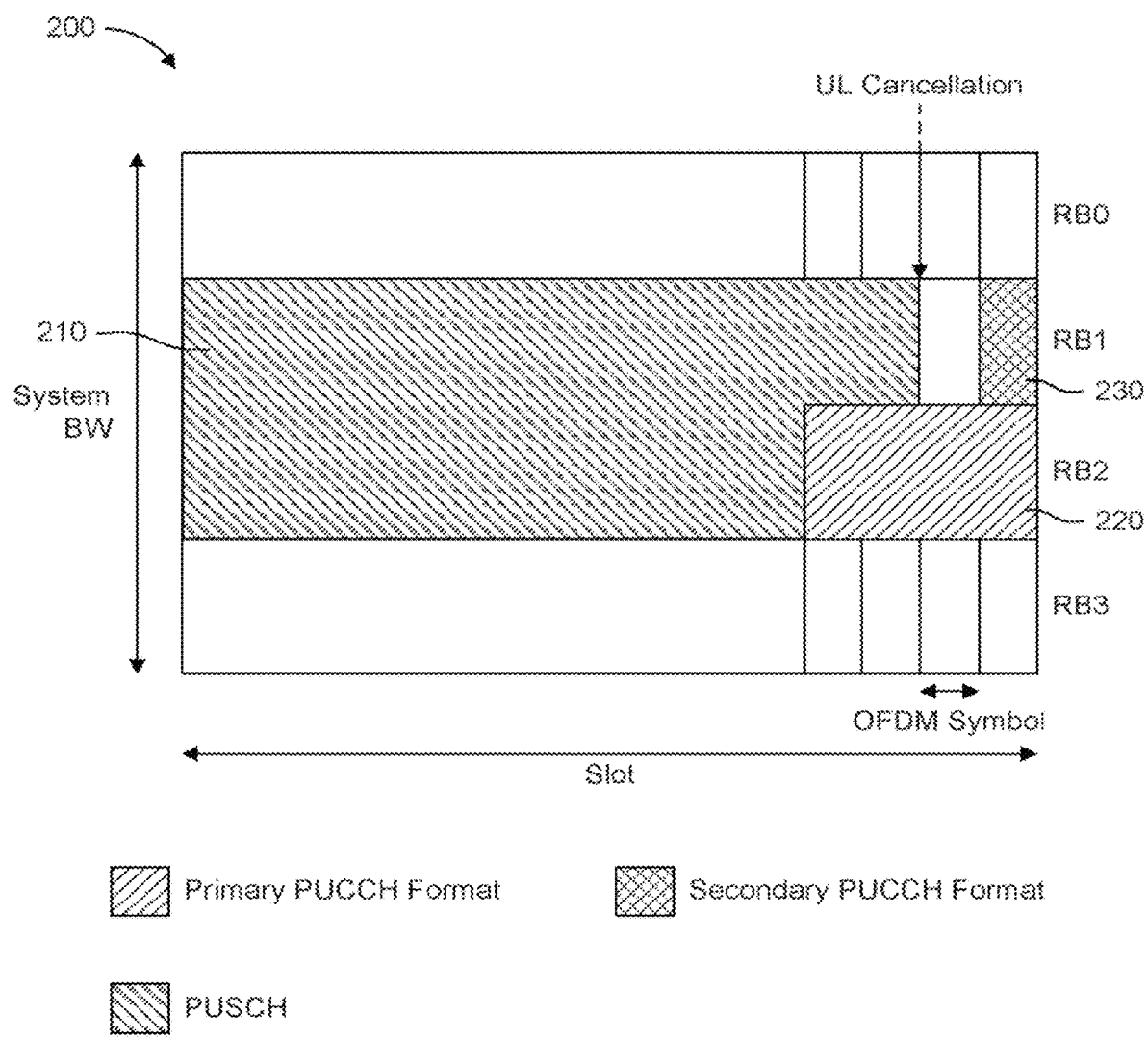
FIG. 2 is a diagram illustrating an example physical uplink control channel (PUCCH) resource identification based on an uplink (UL) cancellation indication.

FIG. 2 is a diagram illustrating an example PUCCH resource identification based on a UL cancellation indication. As shown in an example in diagram 200, UL resources may include 14 symbols in the slot in the time domain and up to 4 subcarriers in the system bandwidth (BW) in the frequency domain. As shown in FIG. 2, the first ten symbol may be allocated for a PUSCH 210. The next two symbols may be allocated to a short PUCCH format, or primary PUCCH format, 220 which may overlap with UL resources, such as resources used for part of the PUSCH 210. The last two symbols also may be short PUCCH formats where both of the last symbols are allocated to the primary PUCCH format 220. The last symbol may also be allocated to the secondary PUCCH format 230.

In one example shown in FIG. 2, the WTRU transmitting 1-2 UCI information bits may perform any of the following three actions. First, the WTRU may determine that the primary PUCCH format 220 is PUCCH format 1 over 4 symbols. For example, these 4 symbols may be allocated to the long PUCCH format. Second, the WTRU may determine that one or more symbols of the determined PUCCH format 1 220 overlaps with the indicated UL resources subject to cancellation, for example, the last 2 symbols shown in FIG. 2. Third, the WTRU may use PUCCH format 0 over 1 symbol, for example, the short PUCCH format as a secondary PUCCH format 230 for 1-2 bits UCI transmission.

In another example, the WTRU transmitting 1-2 UCI information bits may perform any of the following four actions. First, the WTRU may determine that the primary PUCCH format is PUCCH format 1 and a first symbol for the PUCCH transmission provided by a higher layer. For example, the first symbol for the PUCCH transmission provided by a parameter, such as startingSymbolIndex. Second, the WTRU may determine that one or more symbols of the determined PUCCH format 1 overlaps with the indicated UL resources subject to cancellation. Third, the WTRU may use a shortened PUCCH format 1 as a secondary PUCCH format with a different first symbol for the PUCCH transmission. Fourth, the WTRU may determine that the first symbol of the secondary PUCCH format is greater than first symbol of the primary PUCCH format.

The WTRU which is configured with multiple sets of PUCCH resources may perform any of the following five actions. First, the WTRU may determine whether the indicated UL resources subject to cancellation overlap with the primary PUCCH format for a given PUCCH resource set. Second, the WTRU may sequentially examine each PUCCH resource set by incrementing the PUCCH resource set index. For example, the WTRU may increment using pucch-ResourceSetId+1 where pucch-ResourceSetId is provided by a higher layer. Also in the second action, additionally or alternatively, the WTRU may examine a pre-specified list of PUCCH resource sets. Third, the WTRU may determine a secondary PUCCH format in each PUCCH resource set which does not overlap with the indicated UL resources subject to cancellation. Fourth, the WTRU may transmit the UCI on the secondary PUCCH format from a secondary PUCCH resource set. Fifth, the WTRU may determine that the pucch-ResourceSetId of the secondary PUCCH format is greater than the pucch-ResourceSetId of the primary PUCCH format.

The WTRU which is configured with a single PUCCH resource set comprising a list of PUCCH resource indexes, for example, pucch-ResourceId, may perform any of the five actions. First, the WTRU may determine whether the indicated UL resources subject to cancellation overlap with the primary PUCCH format of the configured PUCCH resource set. Second, the WTRU may sequentially examine each PUCCH resource within the configured PUCCH resource set by incrementing the PUCCH resource index. For example, the WTRU may increment using pucch-ResourceId+1 where pucch-ResourceId is provided by a higher layer. Also concerning the second action, additionally or alternatively, the WTRU may examine a pre-specified list of PUCCH resources. Third, the WTRU may determine a secondary PUCCH format within the configured PUCCH resource set which does not overlap with the indicated UL resources subject to cancellation. Fourth, the WTRU may transmit the UCI on the secondary PUCCH format from the configured PUCCH resource set. Fifth, the WTRU may determine that the pucch-ResourceId of the secondary PUCCH format is greater than the pucch-ResourceId of the primary PUCCH format.

In one example in an embodiment, if the WTRU configured with the dedicated PUCCH resource determines that the PUCCH resource overlaps with the indicated UL resources subject to cancellation, the WTRU may use a PUCCH resource configured for transmission of HARQ-ACK information on PUCCH in an initial UL bandwidth part (BWP). In another example, a BWP after an initial BWP may be used.

In another example in an embodiment, if the WTRU is configured with UL cancellation as well as a supplementary (SUL), may transmit the UCI on the PUCCH resources configured on the SUL even if the WTRU is configured by higher layer to transmit the UCI on PUCCH resources on the primary/paired UL cell/carrier. The WTRU may be configured using an implicit indication, an explicit indication, or both.

In another embodiment, if the WTRU is configured with UL cancellation as well as multiple UL carriers/components, may transmit the UCI on the PUCCH resources of the secondary UL cell/carrier which may or may not be paired with the DL primary cell/carrier. The WTRU may be configured using an implicit indication, an explicit indication, or both.

Figure 3:
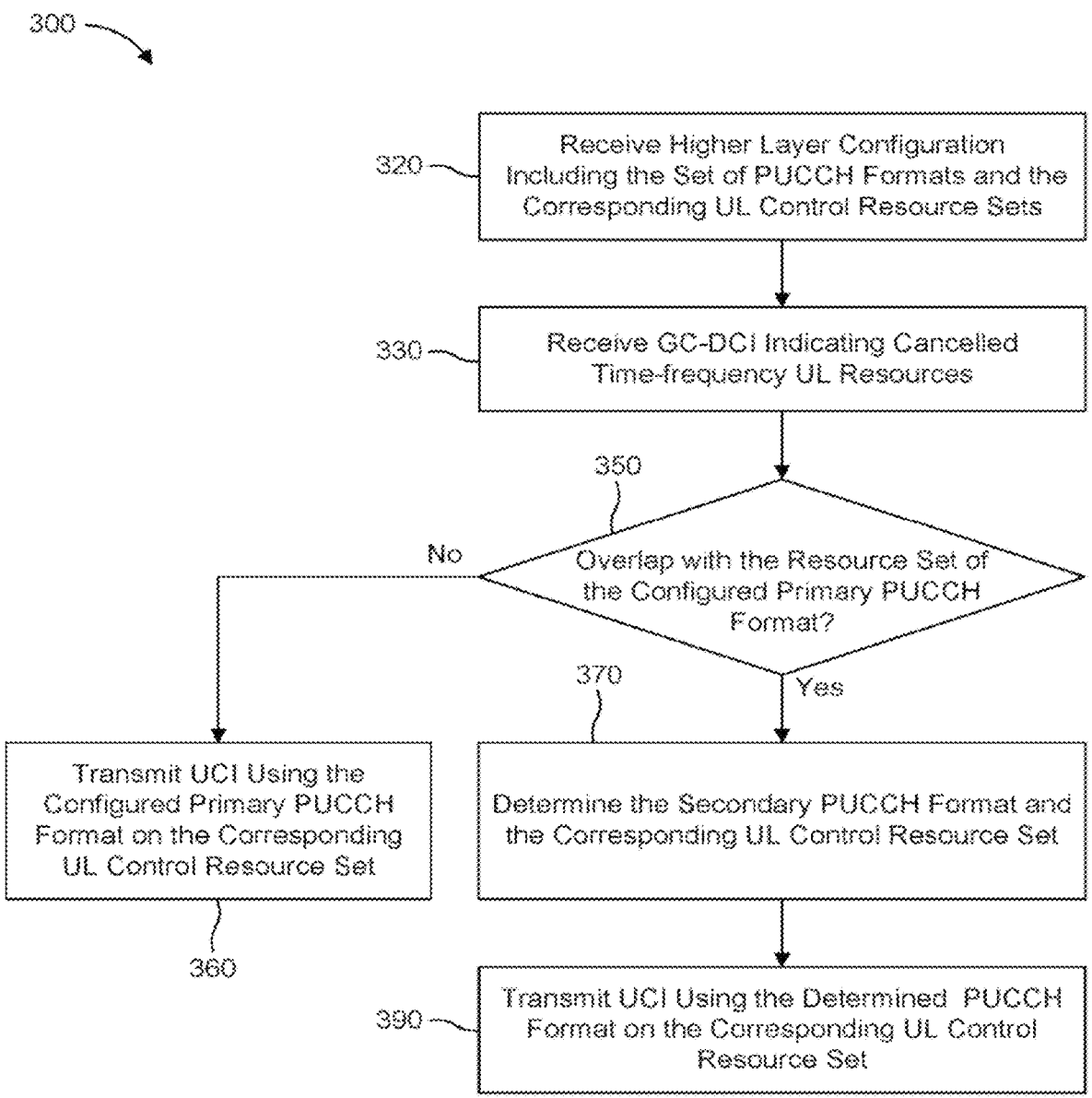
FIG. 3 is a flowchart diagram illustrating an example of a WTRU procedure for adaptation of a PUCCH format and PUCCH resources based on a UL cancellation indication.

FIG. 3 is a flowchart diagram illustrating an example of a WTRU procedure for adaptation of a PUCCH format and PUCCH resources based on a UL cancellation indication. As shown in an example in flowchart diagram 300, an eMBB WTRU may receive a higher layer configuration including the set of PUCCH formats and the corresponding UL control resource sets 320.

Then, the eMBB WTRU may receive group common-DCI (GC-DCI) indicating cancelled time-frequency UL resources 330. In examples, the GC-DCI may indicate the cancelled time-frequency UL resources explicitly, implicitly, or both.

Following this, the eMBB WTRU may check or may determine if there is overlap with the resource set of the configured primary PUCCH format 350. If there is no overlap, the eMBB WTRU may transmit UCI using the configured primary PUCCH format on the corresponding UL control resource set 360. The procedure would end here, in an example.

If there is overlap, the eMBB WTRU may determine the secondary PUCCH format and the corresponding UL control resource set 370. Then, the eMBB WTRU may transmit UCI using the determined PUCCH format on the corresponding UL control resource set 390. The procedure would then end here, in an example. As seen, FIG. 3 shows an exemplary procedure for the eMBB WTRU that is configured with multiple PUCCH formats with different corresponding UL resource sets.

The examples following cover methods for eMBB WTRU cancellation and URLLC WTRU pre-emption with cancellation/scheduling indication decoding failure. Multiple scenarios and examples are provided and may be used individually or in any combination with each other.

Four scenarios will be reviewed. The first scenario is for cancellation indication decoding failure and scheduling indication decoding success. The second scenario is for cancellation indication decoding success and scheduling indication decoding failure. The third scenario is for cancellation indication decoding failure and scheduling indication decoding failure. The fourth scenario is for cancellation indication decoding success and scheduling indication decoding success.

The following covers the first scenario of cancellation indication decoding failure and scheduling indication decoding success. In this case, the eMBB WTRU continues to transmit while the URLLC WTRU also transmits in the resource assuming that the resource is clear. This may result in the failure of both the eMBB transmission and the URLLC transmission.

To ensure that the UL transmission from the URLLC WTRU is reliably received at the base station or gNB, the URLLC WTRU and/or eMBB WTRU may assist the base station or gNB in identifying that the cancellation indication decoding has failed and the eMBB WTRU still continues to transmit in the URLLC transmission resource; UL cancellation has not been successful. The base station or gNB may then take steps to rectify the situation.

In one example in an embodiment, for URLLC WTRU assisted cancellation success identification, the URLLC WTRU may be configured with Interference Measurement Resource(s) (IMR) or Zero Power Channel State Information Reference Symbol (ZP CSI-RS) resources where there is no transmission by the URLLC WTRU on these resources and data is rate matched around them. This allows the base station or gNB to measure the energy/interference on these resources. The base station or gNB may compare the power levels in the IMR resources with the power levels in the eMBB only resources and estimate if the eMBB WTRU successfully stopped transmitting, for example, there is a drop in the power between the two resources, or if it failed to stop transmitting, for example, there is no change in the power between the two resources.

In another example in an embodiment, the eMBB WTRU and URLLC WTRU may jointly assist the base station or gNB in cancellation success identification. The URLLC may be configured with IMR resources or ZP CSI-RS resources where there is no transmission by the URLLC WTRU on these resources and data is rate matched around them. The eMBB WTRU may be configured with a specific sequence, for example, a DMRS or a CSI-RS. The eMBB WTRU may transmit this sequence on the same IMR resources of the URLLC WTRU whenever it detects a cancellation indication from the base station or gNB. This allows the base station or gNB to detect the sequence and validate that the cancellation has been successful, for example, if the eMBB WTRU successfully stopped transmitting, for example, the sequence is detected, or if it failed to stop transmitting, for example, the sequence is not detected.

This transmission of the sequence by the eMBB WTRU in the IMR resources of the URLLC WTRU may serve two functions. The first function is to serve as an acknowledgement to the base station or gNB on receipt of the cancellation indication. The base station or gNB is able to identify the sequence and know that the eMBB WTRU has cancelled its transmission.

The second function allows for the eMBB WTRU to resume transmission after the cancellation with no phase discontinuity between the original transmission and the resumed transmission. The sequence transmitted by the eMBB WTRU may assist the base station or gNB in interpolating the channel estimate before and after cancellation.

It should be noted that a dual solution would be the case where the eMBB WTRU is configured with IMR resources or a ZP CSI-RS while the URLLC WTRU transmits a sequence in this resource. As the eMBB WTRU is cancelled, and the URLLC WTRU reference signal (RS) is known at the base station or gNB, successful reception/detection of the URLLC RS may validate that the URLLC WTRU has successfully received its scheduling indication. In an example, the scheduling indication may be an uplink grant.

Figure 4:
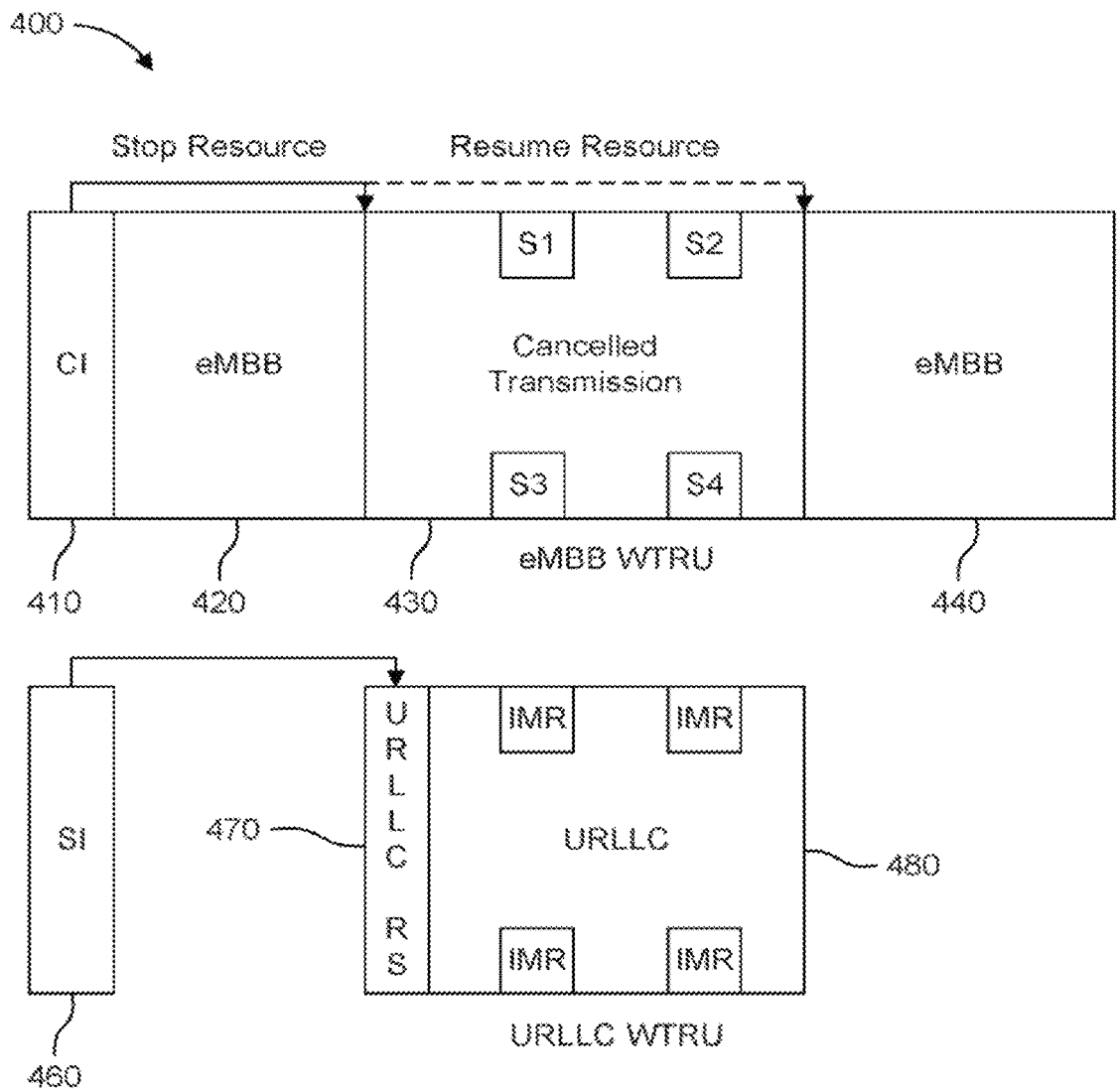
FIG. 4 is a diagram illustrating an example of both an enhanced massive mobile broadband (eMBB) frame structure and a ultra-reliable low latency (URLLC) WTRU frame structure.

FIG. 4 is a diagram illustrating an example of both an eMBB WTRU frame structure and a URLLC WTRU frame structure. As shown in an example in diagram 400, eMBB WTRU frame structure and a URLLC WTRU frame structure may be used with the IMR and sequences with preemption. As shown in FIG. 4, an eMBB WTRU may utilize a cancellation indication (CI) to know whether the eMBB WTRU should stop transmitting eMBB data 420 shown by a stop resource process. A resume resource process may then have eMBB WTRU resume data transmission, such as eMBB data 440, through any of the available resources (S1, S2, S3, or S4).

Further, a URLLC WTRU may work with system indicator (SI) 460 and URLLC RS 470 to monitor and decide whether any of the IMR resources the URLLC WTRU has available to it needs to be involved with termination of data transmission or boosting power on interrupted resources during the URLLC WTRU's preemption transmission.

The eMBB WTRU may use the following example procedure. This procedure may be split into six steps. Any one or all of the six steps may be used. Further, the steps may be used in any combination with each other.

In the first step, the WTRU may receive a higher layer configuration on the identification sequence to transmit during cancellation. This may be WTRU specific or a sequence common to all WTRUS.

In the second step, the WTRU may monitor for and receive a CI, such as CI 410.

In the third step, the WTRU may receive information specific to the eMBB WTRU sequence/resource. This information may be separate from the CI. For example, the information may be received on a dedicated DCI. Additionally or alternatively, the information may be transmitted with the CI. For example, the information may be jointly encoded and received in the same DCI as the CI.

Additionally in the third step, the eMBB WTRU sequence configuration and/or resources may be signaled explicitly in the CI. The signal may be a configuration for the sequence, for example, a CSI-RS, a DMRS, and the like, that may match the time-frequency pattern of one or more URLLC IMR resources for one or more URLLC WTRUs. The signal may be an index to a predefined table or an index to an radio resource control (RRC) configuration table.

Also in the third step, the eMBB WTRU sequence configuration may be signaled implicitly. For example, the configuration may be signaled implicitly by the CI, the DCI, the radio network temporary identifier (RNTI) and the like. The signal may also include the URLLC IMR resource, for the URLLC WTRU, to the eMBB WTRU.

In the fourth step, the eMBB WTRU may stop data transmission during the cancelled resource. In an example, the data may be saved or buffered for later transmission.

In the fifth step, the eMBB WTRU may transmit the identification sequence in the resources corresponding to the IMR resource of the URLLC WTRU. In the case that the IMR resource length is shorter than the length of the identification sequence, the eMBB WTRU may transmit a subset of the identification sequence, for example, a truncated or sampled value of the sequence, to the gNB. Also, in the case that the IMR resource length is longer than the length of the identification sequence, the eMBB WTRU may transmit a sequence of appropriate length derived from the identification sequence, for example, a cyclic extension, to the gNB.

In the sixth step, the eMBB WTRU may stop transmission of its data or may resume transmission its data after the URLLC WTRU has stopped transmitting. It should be noted that if the eMBB WTRU resumes transmission. It may puncture the original transmission or it may shift the original transmission to avoid the outgoing resource. The eMBB WTRU may continuously monitor for new CIs and override a current CI if a new CI arrives.

Still focusing on the cancellation indication decoding failure and scheduling indication decoding success scenario, the URLLC WTRU may use the following procedure split into four steps. Any one or all of the four steps may be used. Further, the steps may be used in any combination with each other.

In the first step, the WTRU may receive higher layer configuration on the IMR resources to use during preemption transmission. The configuration may be received directly or indirectly. Further, the configuration may be received as an indication. The indication may be received implicitly, explicitly, or both.

In the second step, the WTRU may receive scheduling and transmission information, such as the uplink grant. This information may be separate from the CI, which may be transmitted on a dedicated DCI. Alternatively or additionally, this information may be transmitted with the CI jointly encoded and transmitted in the same DCI.

In the third step, the WTRU may start URLLC transmission in the assigned resource. The WTRU may rate match its data around the IMR resources during the cancellation period.

In the fourth step, the WTRU may continue monitoring the CI, the scheduling indicator, or both. This is necessary in the case that the gNB identifies the failure of the CI and wants to terminate the transmission, or for example, boost the transmitted power on the interrupted resources.

Figure 5:
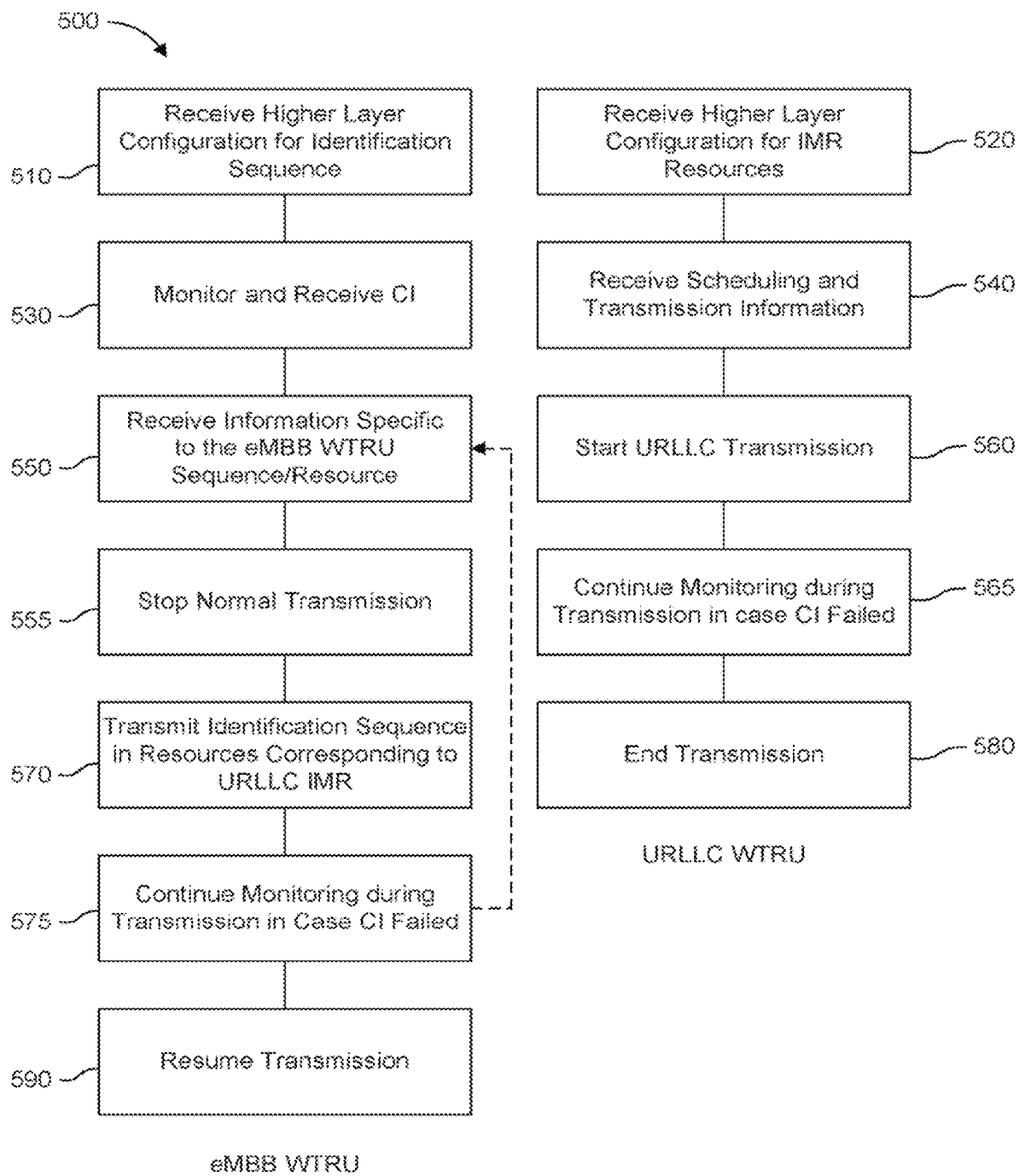
FIG. 5 is a flowchart diagram illustrating example procedures for an eMBB WTRU and an URLLC WTRU.

FIG. 5 is a flowchart diagram illustrating example procedures for an eMBB WTRU and a URLLC WTRU. Example procedures for the eMBB WTRU and URLLC WTRU described above are shown in examples in diagram 500. For example, the eMBB WTRU may receive a higher layer configuration for identification sequences 510. The configuration may be received directly or indirectly. Further, the configuration may be received as an indication. The indication may be received implicitly, explicitly, or both.

Next, the eMBB WTRU may monitor and receive CI 530. Then, the eMBB WTRU may then receive information specific to the eMBB WTRU sequence or resource 550. Next, the eMBB WTRU may stop normal transmission 555. Accordingly, the eMBB WTRU may transmit identification sequence in resources corresponding to URLLC IMR 570. Further, the eMBB WTRU may continue monitoring during transmission in case the CI failed 575. As seen in FIG. 5, the arrow indicates that the procedure may loop back to receiving 550 depending on whether CI failed. Lastly, the eMBB WTRU may resume transmission 590.

Moreover, the URLLC WTRU may receive a higher layer configuration for IMR resources 520. The configuration may be received directly or indirectly. Further, the configuration may be received as an indication. The indication may be received implicitly, explicitly, or both.

Next, the URLLC WTRU may receive scheduling information and transmission information 540. Following that, the URLLC WTRU may start a URLLC transmission 560. Next, the URLLC WTRU may continue monitoring during transmission in case the CI failed 565. Lastly, the URLLC WTRU may end the URLLC transmission 580.

In an example in an embodiment, the URLLC WTRU may assume a higher probability of failure of the eMBB cancellation indication and modify its transmission to accommodate the possibility of interference, for example, by boosting its power or by transmitting with a lower MCS. The URLLC WTRU may be configured with multiple transmission parameter configurations, for example, power levels, MCS, and the like, and the scheduling DCI may indicate the appropriate configuration to use, for example, based on the capability of the interfering eMBB WTRU, or on the aggregation level or reliability with which the eMBB cancellation indication was sent. The solution combines the WTRU cancellation and power methods in one scheme.

One example in an embodiment involves transmitting the eMBB WTRU cancellation indication at the same high reliability levels as the URLLC scheduling indication. This ensures that the probability of either of the indications failing is approximately the same. This may not be possible if the two WTRUs have different capabilities.

The following addresses cancellation indication decoding success and scheduling indication decoding failure scenarios. In the case of cancellation indication decoding success and scheduling indication decoding failure, the eMBB WTRU may stop its transmission while the URLLC WTRU does not transmit in the cleared resource. This results in a wastage of the transmission resource.

In an example in an embodiment, the gNB is able to identify this scenario by the silence in the channel. Additionally or alternatively, the gNB may be able to identify the scenario by identifying a sequence, for example, an RS, transmitted by the eMBB WTRU in configured resources that overlap with IMR resources of the URLLC WTRU.

In this example, the gNB may restart the entire procedure, for example, send new cancellation and scheduling indicators to the WTRU. Additionally or alternatively, the gNB may send a new scheduling indicator to the URLLC WTRU if there are still enough resources for the URLLC WTRU to receive the indicator, decode the indicator and send URLLC WTRU data to the gNB.

The following examples address the cancellation indication decoding failure and scheduling indication decoding failure scenario. In this case of cancellation indication decoding failure and scheduling indication decoding failure, the eMBB WTRU may continue its transmission while the URLLC WTRU does not transmit in the cleared resource. This may result in failure of preemption.

Note that in the case the eMBB WTRU is configured to transmit an identifying sequence in configured resources that overlap with IMR resources of the URLLC WTRU, the gNB may be able to identify this scenario by the fact that there is no identifiable sequence from either the eMBB WTRU or the URLLC WTRU.

The following examples address the Cancellation Indication Decoding Success and Scheduling Indication Decoding Success scenario. In the case of cancellation indication decoding success and scheduling indication decoding success, the eMBB WTRU may be able to successfully decode the cancellation indication and the URLLC WTRU is able to successfully decode the scheduling indication, the eMBB WTRU stops transmission and allows the URLLC WTRU to transmit in the resource. The eMBB WTRU may or may not resume transmission on completion of the URLLC WTRU transmission. Note that the two indications may be sent separately or as one signal.

The following addresses behavior on successful reception of a CI. In an example in an embodiment concerning behavior on successful reception of a CI, the eMBB WTRU may continue to monitor the scheduling indication resources even if it has been scheduled, to allow it to stop a cancellation period and restart another cancellation period in the case that the gNB assigns a new resource, for example, based on preemption failure. This may enable the gNB recover from a failure scenario identifies that there has been a failure in the preemption procedure. Any information received by a successfully received CI may override the information received by a previously received CI even if the information from the previously received CI is still current. On identification of a failure the gNB may restart the preemption procedure immediately.

In another example in an embodiment, the URLLC WTRU may continue to monitor the scheduling indication resources even if it has been scheduled, to allow it to terminate a transmission and possibly restart another transmission in the case that the gNB assigns a new resource, for example, based on preemption failure. This may enable the gNB recover from a failure scenario identifying that there has been a failure in the preemption procedure. Any information received by a successfully received SI may override the information received by a previously received SI even if the information from the previously received SI is still current. On identification of a failure, the gNB may restart the preemption procedure immediately.

In another example in an embodiment, the eMBB WTRU may monitor for multiple CIs from the gNB. The multiple CIs may all point to the same cancelled resource to reduce the probability of eMBB CI decoding failure.

In another example in an embodiment, the eMBB WTRU may monitor for multiple CIs from the gNB. Each CI may point to a separate cancelled resource. The cancellation resources may be entirely orthogonal or may overlap to reduce the latency of the URLLC WTRU transmission on identification of a failed preemption procedure.

The following cover examples of an embodiment of methods for PUSCH cancellation indication by GC-DCI and corresponding PUSCH adaptation. Example in an embodiment for indication of PUSCH cancellation by group-common DCI is to explicitly indicate the cancelled/interrupted resources by the GC-DCI and have a procedure for the eMBB WTRU to determine the cancellation of its PUSCH or its adaptation based on the modified set of resources.

As an example, for the case of UL transmission with configured grant, the eMBB WTRU may determine the active set of UL resources for a UL configured grant based on a combination of Pool of UL configured resources configured by higher layer signaling. The eMBB WTRU may also determine that a dynamically indicated set of cancelled resources may be indicated explicitly by a GC-PDCCH carrying GC-DCI. For example, the cancellation indication may indicate a configured grant index, or a configured grant group index. Upon receiving a cancellation indication indicating a certain configured grant, the WTRU may cancel the ongoing transmission, or the transmission that is about to start, on the indicated configured grant. Lastly, the eMBB WTRU may also determine that a timer indicating the validity/expiration of the UL cancellation period. Further, the timer can be triggered by MAC CE or DCI carrying cancellation indication. A component carrier applicable for cancellation may also be utilized.

Figure 6:
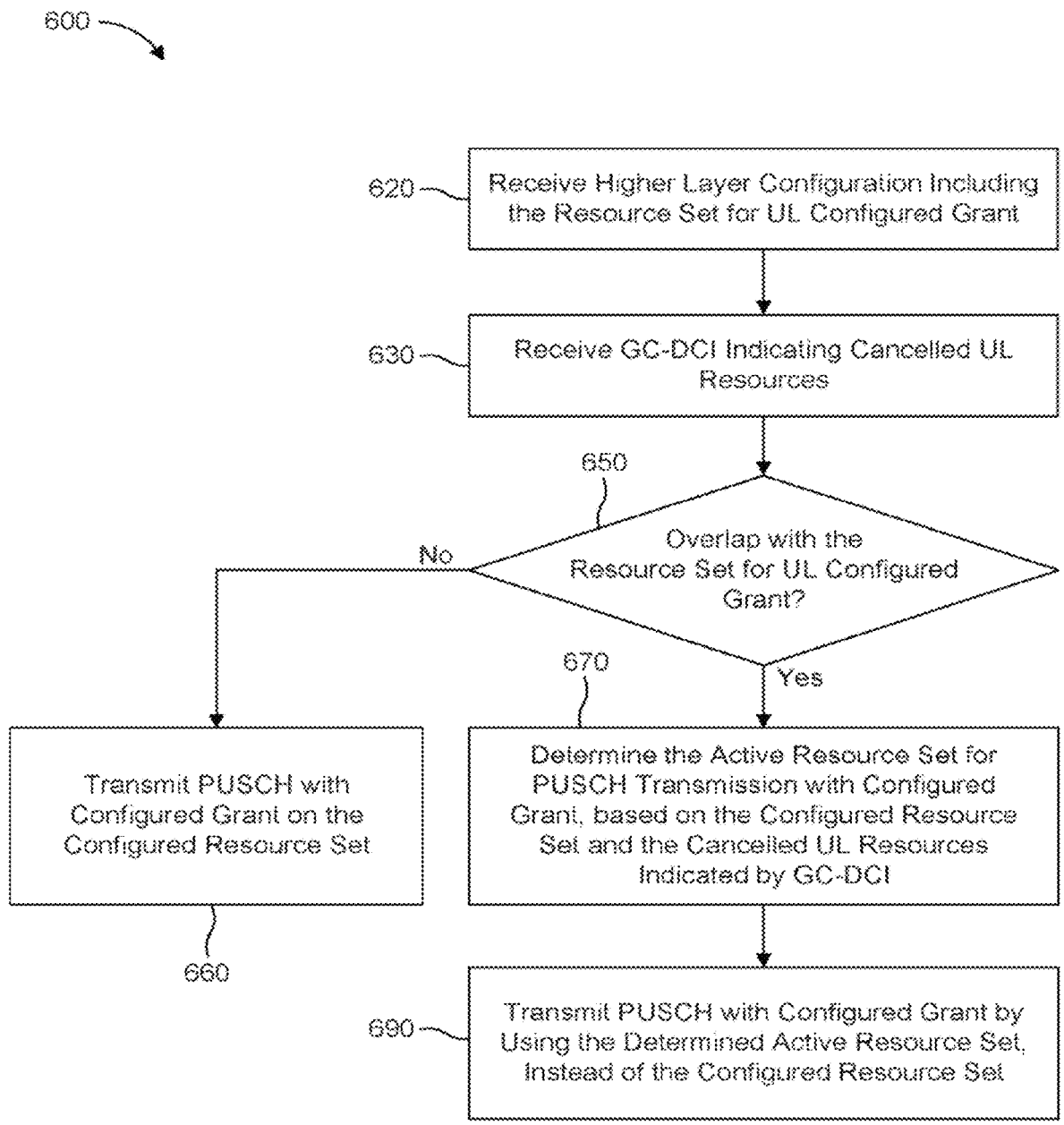
FIG. 6 is a flowchart diagram illustrating an example of an eMBB WTRU procedure for adaptation of UL transmission with a configured grant, in the presence of an explicit indication of cancelled UL resources by group common-downlink control information (GC-DCI)

FIG. 6 is a flowchart diagram illustrating an example of an eMBB WTRU procedure for adaptation of UL transmission with a configured grant, in the presence of an explicit indication of cancelled UL resources by GC-DCI. As shown in an example in diagram 600, an eMBB WTRU may receive a higher layer configuration including the resource set for a UL configured grant 620. Next, the eMBB WTRU may receive GC-DCI indicating cancelled UL resources 630. Accordingly, the eMBB WTRU may determine or may check to see if there is overlap with the resource set for the UL configured grant 650. If there is no overlap, the eMBB WTRU may transmit on a PUSCH with a configured grant on the configured resource set 660. In examples, the WTRU may transmit based on a procedure in NR. In other examples, WTRU may transmit based on other procedures. In an example, the procedure may end here.

If there is overlap, the eMBB WTRU may determine the active resource set for PUSCH transmission with the configured grant, based on the configured resource set and the cancelled UL resources indicated by GC-DCI 670. Moreover, if there is overlap, the eMBB WTRU may transmit on a PUSCH with the configured grant by using the determined active resource set, instead of the configured resource set 690. In an example, the procedure may end here.

Figure 7:
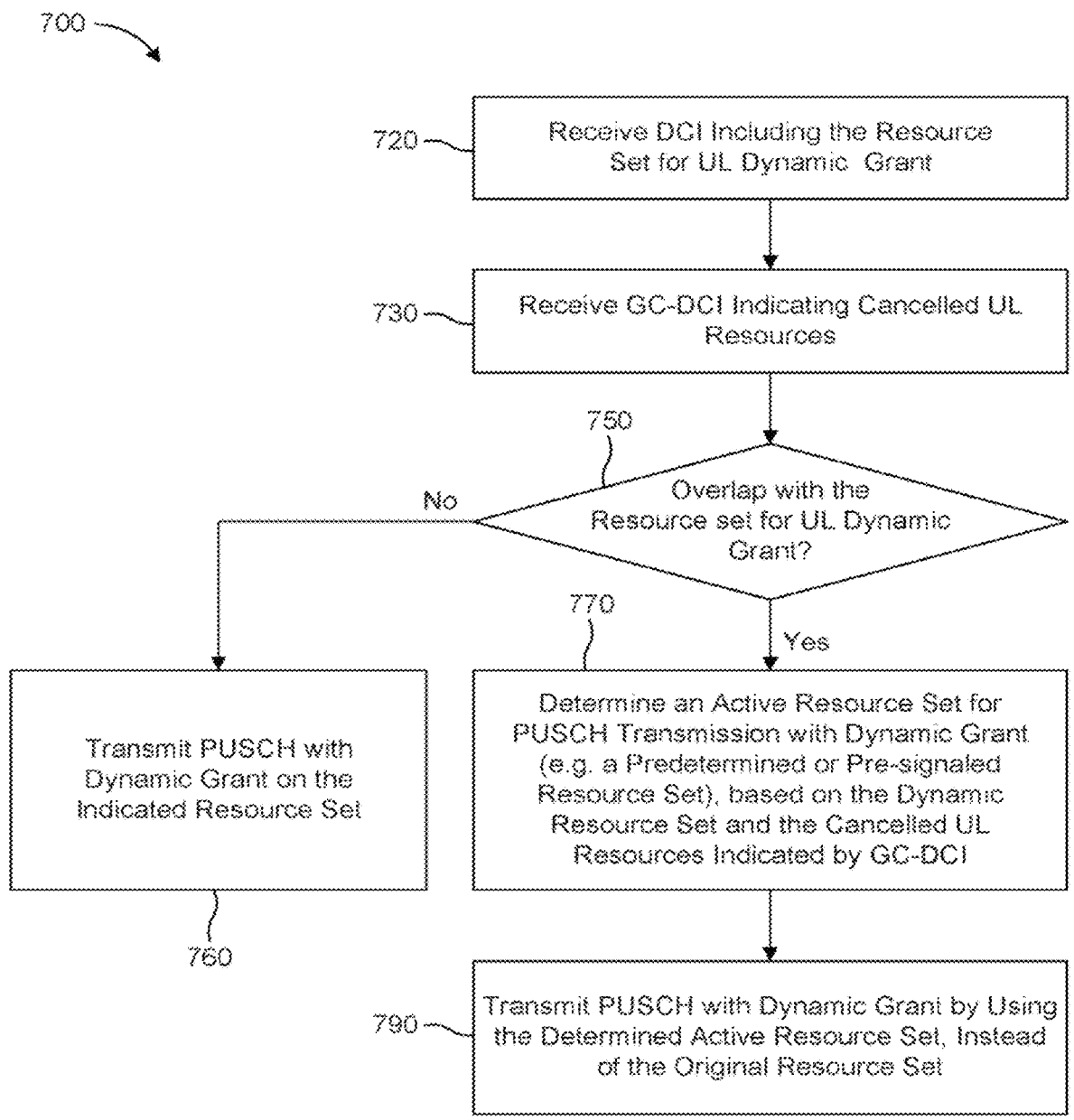
FIG. 7 is a flowchart diagram illustrating an example of an eMBB WTRU procedure for adaptation of UL transmission with a dynamic grant, in the presence of an explicit indication of cancelled UL resources by GC-DCI.

FIG. 7 is a flowchart diagram illustrating an example of an eMBB WTRU procedure for adaptation of UL transmission with a dynamic grant, in the presence of an explicit indication of cancelled UL resources by GC-DCI. As an example, for the case of UL transmission with dynamic grant, the eMBB UE may determine the active set of UL resources based on a DCI that indicates the resources it should transmit in. A pool of UL dynamically indicated resources may be sent by the DCI. A set of cancelled resources may also be dynamically indicated. For example cancelled resources may be indicated explicitly by GC-PDCCH carrying GC-DCI. For example, the dynamic grant may be sent with an identifying index. The cancellation indication may indicate a specific dynamic grant based on the identifying index. Upon receiving a cancellation indication indicating a certain dynamic grant or set of dynamic grants, the WTRU may cancel the ongoing transmission, or the transmission that is about to start, on the indicated dynamic grant.

A timer indicating the validity/expiration of the UL cancellation period may also be utilized. The timer can be triggered by MAC CE or DCI carrying cancellation indication. A component carrier applicable for cancellation may also be utilized.

As shown in an example in diagram 700, an eMBB WTRU may receive a DCI including the resource set for a UL dynamic grant 720. Next, the eMBB WTRU may receive GC-DCI indicating cancelled UL resources 730. Accordingly, the eMBB WTRU may determine or may check to see if there is overlap with the resource set for the UL dynamic grant 750. If there is no overlap, the eMBB WTRU may transmit on a PUSCH with a dynamic grant on the indicated resource set 760. In examples, the WTRU may transmit based on a procedure in NR. In other examples, WTRU may transmit based on other procedures. In an example, the procedure may end here.

If there is overlap, the eMBB WTRU may determine an active resource set for PUSCH transmission with the dynamic grant, based on the dynamic resource set and the cancelled UL resources indicated by GC-DCI 770. In an example, the resource set may be a predetermined or pre-signaled resource set. Moreover, if there is overlap, the eMBB WTRU may transmit on a PUSCH with the dynamic grant by using the determined active resource set, instead of the original resource set 790. In an example, the procedure may end here.

In an example in the method of UL cancellation indication by GC-DCI, a WTRU may be provided by a higher layer parameter "UplinkCancellation" and is configured with an specific RNTI, which may be called "CAN-RNTI", for monitoring a GC-PDCCH conveying a GC-DCI indicating the UL cancellation. This GC-DCI may have its specific format dedicated to UL cancellation indication (for example DCI format 2_4). This DCI format 2_4 may be used for notifying the PRB(s) and OFDM symbol(s) where WTRU may assume no transmission is expected from the WTRU.

Additionally or alternatively, the WTRU may use an INT-RNTI, which is used for monitoring downlink preemption, for also monitoring UL cancellation. In this case, a DCI may be used to convey both a downlink preemption and uplink cancellation indication. In an example, the DCI may be a DCI format 2_1 defined in NR. In addition, the WTRU may determine which part of the DCI format 2_1 is indicating downlink preemption indication or UL cancellation indication, explicitly based on some higher layer configuration, for example, when the WTRU is simultaneously configured with both UL cancellation and DL preemption, and/or implicitly based on other parameters, for example, the DCI payload size or based on an additional field in the DCI itself. In the above scenario, the following information may be transmitted by the DCI format 2_1 with CRC scrambled by INT-RNTI: [Pre-emption indication 1, . . . , Pre-emption indication N, UL Cancellation indication].

In the case of being configured for monitoring UL cancellation, the WTRU may be also configured with a set of serving cells by higher layer parameter CAN-Configuration-PerServingCell that includes a set of serving cell indexes provided by corresponding higher layer parameters serving-CellII and a corresponding set of locations for fields in DCI format 2_3 by higher layer parameter positioninDCI. Also, the payload size of the GC-DCI conveying the UL cancellation indication may be semi-statically configured for the WTRU.

The GC-DCI for UL cancellation indication may carry a bitfield or bit string which can be mapped to the UL cancelled resources explicitly indicating the frequency and time of the cancelled resources in RBs and OFDM symbols. The granularity for time-frequency resources may be semi-statically configured by a higher layer. This configuration may be the same or different from a configuration of a parameter granularity for time-frequency resources for a downlink preemption indication. In one example, the granularity for time-frequency resources may be configured by higher layer parameter timeFrequencySet, which is also used as a downlink preemption indication. In one example, the bits of the UL cancellation indication may be grouped into several groups of the same size, and each group of bits may correspond to a subset of frequency bandwidth, for example, a subset of PRBs of the bandwidth part, or a symbol or a subset of symbols in the monitoring period or a combination of the frequency and time subsets. In this case, the bits of each group may indicate cancellation in that time-frequency subset of resources.

Figure 8:
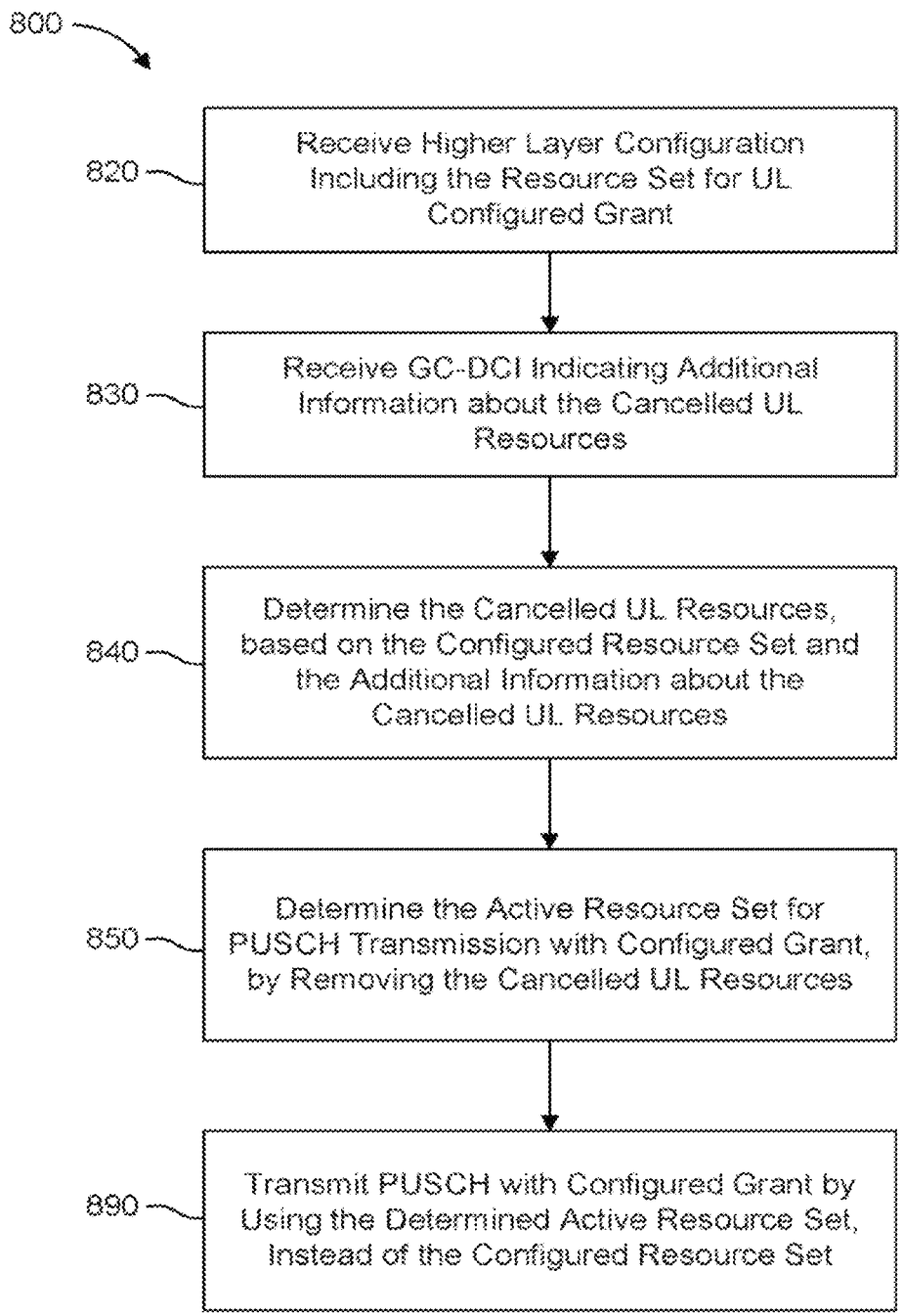
FIG. 8 is a flowchart diagram illustrating an example of a WTRU procedure to determine the set of cancelled resources, based on a combination of a semi-static configuration and a dynamic indication through GC-DCI.

FIG. 8 is a flowchart diagram illustrating an example of a WTRU procedure to determine the set of cancelled resources, based on a combination of a semi-static configuration and a dynamic indication through GC-DCI. As shown in an example in flowchart diagram 800, another method for indicating the cancelled resources through GC-DCI is to convey information about the cancelled resources in GC-DCI, such that together with the configuration, a WTRU may determine the set of cancelled UL resources. As an example, a bit field in GC-DCI may indicate a subset of frequency resources, among the configured resources, that correspond to the cancellation. In this method, the frequency resources of the cancelled UL transmission are indicated relative to the configured set/pool of resources for the configured UL grant, instead of being explicitly indicated or being indicated relative to the corresponding bandwidth part.

Another question in an example using a PUSCH cancellation indication is how to support resumption of PUSCH transmission after cancellation. One solution to support PUSCH cancellation with the possibility of automatic resumption by the WTRU is to indicate the resources for the resumed UL transmission by signaling the time shift to be applied to the original grant. In examples, the time shift may be indicated in terms of one or more of slots/mini-slots/symbols/monitoring periods. This time shift may be included in the cancellation indication as part of the DCI or may be implicitly obtained from other parts of the cancellation indication, for example, time resources corresponding to the cancellation.

As shown in an example in flowchart diagram 800, a WTRU may receive higher layer configuration including a resource set for a UL configured grant 820. After that, the WTRU may receive GC-DCI indicating additional information about the cancelled UL resources 830. Next, the WTRU may determine the cancelled UL resources, based on the configured resource set and that the additional information about the cancelled UL resources 840. Following this, the WTRU may determine the active resource set for PUSCH transmission with configured grant, by removing the cancelled UL resources 850. Moreover, the WTRU may transmit on a PUSCH with a configured grant by using the determined active resource set, instead of the configured resource set 890.

In some solutions in examples, a WTRU may be configured to monitor a continuation indication or CoI on at least one search space for a PDCCH. The WTRU may initiate or continue a transmission that overlaps with a certain time-frequency resource only under a condition that it receives a continuation indication for such resource. Otherwise, the WTRU may not initiate or interrupt the transmission at least for the portion overlapping over the resource, and possibly for any portion occurring during or after the resource. A time-frequency resource may be signaled using, for example, one or more of the solutions or examples described herein for the cancellation or pre-emption indication. This approach has the benefit of enhancing the protection of high-priority transmissions since failure of decoding the indication by other WTRUs would not cause them to continue transmitting and interfering.

A confirmation indication may also be used to indicate that the WTRU performs a transmission using a non-reduced transmission power, or more generally according to a first set of transmission power parameters. Otherwise, the WTRU may perform a transmission using a reduced transmission or according to a second set of transmission power parameters at least for the portion overlapping over the resource, or possibly for the whole duration of the transmission.

For example, a WTRU may be scheduled to perform a PUSCH, PRACH, PUCCH or SRS transmission and determine that the transmission overlaps with at least one resource concerned by a confirmation indication. Such determination may be based on a higher layer configuration indicating a set of resources in time and frequency and possibly recurring in the time domain, along with a search space configuration for the corresponding confirmation indication. For example, the higher layer configuration may indicate a subset of time symbols and resource blocks within a slot, the identity of a search space including periodicity and offset, and possibly a parameter indicating a time offset between a decoded CoI and a set of corresponding resources. The confirmation indication may further indicate a subset of resources for which transmission can proceed among a set of corresponding resources, for example, resources within a slot and bandwidth part, for instance using a bitmap. The WTRU may proceed with the transmission overlapping with a resource subject to a confirmation indication only if it received such confirmation indication for the resource.

Such determination may be based on Layer 1 signaling, from RRC configuration, from MAC-CE signaling or from a combination of all three signaling types. The Layer 1 signaling may include, for example, a corresponding PDCCH or DCI, for example a WTRU-specific PDCCH, or a GC-PDCCH. The signaling may indicate a set of resources in time and frequency and possibly recurring in the time domain. The signaling may also contain search space configuration for the corresponding confirmation indication or may point to information that is higher layer configured, for example, a search space table, to signal this. For example, the signaling may indicate one or more of a subset of time symbols and resource blocks within a slot, the identity of a search space including periodicity and offset, and a parameter indicating a time offset between a decoded CoI and a set of corresponding resources. The confirmation indication may further indicate a subset of resources for which transmission can proceed among a set of corresponding resources, for example, resources within a slot and bandwidth part, for instance using a bitmap. The WTRU may proceed with the transmission overlapping with a resource subject to a confirmation indication only if it received such confirmation indication for the resource.

For any solution described in this document, such solution may also be applicable where instead of receiving a cancellation indication for a given resource or transmission, the WTRU fails to receive a confirmation indication for such resource or transmission when subject to confirmation.

Prioritization aspects are described herein. For example, cancellation/confirmation using priority levels in inter-WTRU multiplexing is described below.

A transmission may be assigned a priority level or transmission profile, for example, corresponding to eMBB or URLLC. Such a priority level may be obtained from a corresponding PDCCH or DCI, from RRC configuration and/or from MAC signaling, such as MAC CE signaling. For example, in the case of HARQ-ACK, dynamic grant or configured grant type 2 for PUSCH, aperiodic SRS, the priority level may be obtained from a corresponding PDCCH or DCI. In another example, in the case of configured grant type 1 for PUSCH, scheduling request, the priority level may be obtained from an RRC configuration. In a further example, in the case of scheduling request or PUSCH, the priority level may be obtained from MAC signaling, such as MAC CE signaling.

A cancellation indication (CI) or confirmation indication (CoI) may be assigned a set of priority levels indicating applicability to a transmission of a given priority level or priority index. For example, a cancellation indication may only be applicable to priority levels equal to or below a certain level. In an example, the priority level or the priority index may be zero ("0") or may be one ("1"). In a further example, the priority level or priority index may correspond to eMBB only. Additionally or alternatively, another priority level or priority index may correspond to URLLC. The set of applicable priority levels may be configured by signaling to the WTRU along with a set of resources subject to cancellation or confirmation indication. In an example, the signaling may be MAC CE signaling. Additionally or alternatively, the signaling may be by way of an RRC configuration. For example, the RRC configuration may indicate whether the CI is applicable to all priority index values, or just to the lowest priority index, for example, zero ("0"). Additionally or alternatively, the applicable priority levels may be included as part of the CI itself or the CoI itself. For example, such an indication may be in a field of the DCI or used by the C-RNTI to decode the PDCCH. In case only two priority levels are defined, a CI or CoI may implicitly only be applicable to transmission of the lowest priority level. In such case, the WTRU may only monitor the indication for a transmission of the lowest priority.

In another example method, the WTRU may monitor the CI in a multi-step process to determine the resource allocation of the cancelled resource and/or whether it is applicable to the WTRU. For example, the WTRU may first monitor a GC-DCI in a first step, possible on a preconfigured subset of coresets or search spaces. After receiving a first indication in the first step, the WTRU would then monitor the PDCCH on second set of PDCCH resources, coreset(s), search space(s), and/or DCI or RNTI formats to determine the resources applicable for cancellation, possibly at a better granularity. In one example, the CI in the first step may further indicate applicability to a subset of WTRUs, where applicability is indicated per a specific priority level, transmission profile, a WTRU capability, and/or an RNTI value.

In one example, a WTRU may be configured with a number of transmission profiles, or priority levels, by higher layers, for example a RRC configuration. A priority level may correspond to a priority index. The WTRU may determine the transmission profile, or priority level, for a given transmission based on a priority level signaling that is indicated to the WTRU part of a DCI or part of an RRC message and is applicable for the transmission, for example a PUSCH transmission or a PUCCH transmission. The WTRU may alternatively determine the transmission profile, or the priority level, based on the highest priority logical channel (LCH) mapped to the transmission, or the LCH that is related to or triggered the transmission. The WTRU may alternatively determine the transmission profile, or the priority level, based on a semi-statically configured mapping between LCHs and transmission profiles, whereby the WTRU associates the transmission profile for the transmission according to the highest priority LCH mapped to, related to, or that has triggered the transmission. The WTRU may further receive a CI with an associated priority level or an associated transmission profile, which may be used by the WTRU to determine whether it is applicable to the WTRU or not.

In one example solution, the WTRU may be configured to monitor for the CI prior to the start of the transmission, and/or between the instance of resource allocation DCI reception and the PUSCH start. The WTRU may also determine that the resource applicable for cancellation has passed or started already. The WTRU may monitor the CI as a function of the WTRU capability and/or the priority level of its scheduled transmission, or transmission profile of its scheduled transmission. For example, the WTRU may monitor for the CI only if the priority level associated with the transmission, or the transmission profile associated with the transmission, is below a certain threshold and/or the WTRU is of a certain capability. For example, in case the priority index of a transmission may be one of two possible values, such as 0 or 1, a CI may be applicable to a transmission of priority index 0 only.

After receiving a CI, the WTRU may cancel the transmission if at least one of the following is satisfied. For example, the WTRU may cancel the transmission if the WTRU determines that the CI is applicable to the WTRU.

In another example, the WTRU may cancel the transmission if the WTRU determines that the transmission to be potentially cancelled overlaps with the resource indicated in part of the CI.

In a further example, the WTRU may cancel the transmission if the transmission profile of the transmission to be potentially cancelled is lower than the transmission profile indicated by the cancellation indication. In still another example, the WTRU may cancel the transmission if the transmission profile of the transmission to be potentially cancelled is or higher than the transmission profile indicated by the cancellation indication.

In yet another example, the WTRU may cancel the transmission if the priority level of the transmission to be potentially cancelled is lower than the priority level indicated by the CI.

In still another example, the WTRU may cancel the transmission if the WTRU determines that the overlapping part in both frequency and time domains is larger than a certain threshold, whereby the threshold is either configured by higher layers, the threshold is dependent on the size of the resource of the ongoing transmission, or both.

In yet a further example, the WTRU may cancel the transmission if the WTRU received the CI at least a minimum processing time before the applicable cancellation start time. The WTRU may be specified or configured with multiple cancellation points, whereby the WTRU may apply the next cancellation point that is at least a minimum processing time away from the instance in time it received the CI. For example, the WTRU may be specified to cancel a PUSCH transmission within a number of symbols from the instance at which the WTRU receives the CI. In an example, the number of symbols may be 3 symbols.

If the WTRU receives the CI prior to the start of a PUSCH transmission or a PUCCH transmission to be cancelled, the WTRU may perform at least one of the following processes. Further, if the WTRU receives the CI before a certain minimum processing time from the start of the transmission, the WTRU may perform at least one of the following processes.

The WTRU may generate a CBG-based PUSCH transmission for the CBGs that do not overlap the resource indicated by the CI. Further, the WTRU may not generate a MAC PDU for the PUSCH grant if the PUSCH cannot be partially transmitted.

Moreover, the WTRU may determine an alternative, an additional, or an overflow resource to transmit the PDU, or UCI, on, if the transmission has not already started. For example, after determining that the CI refers to a certain configured grant index, the WTRU may select another configured grant with the same transport block size (TBS) if the selected configured grant also meets the configured logical channel prioritization (LCP) restrictions for the LCHs included in the PDU.

After receiving a CI with a priority level lower than the that of the transmission to be potentially cancelled, the WTRU may adjust its transmission power or apply a different set of power control parameters to the transmission, in an example. In a further example, after receiving a CI with a transmission profile lower than the that of the transmission to be potentially cancelled, the WTRU may adjust its transmission power or apply a different set of power control parameters to the transmission. Such an adjustment of application may be further conditioned on receiving the CI prior to the start of a PUSCH transmission or a PUCCH transmission to be cancelled, or before a certain minimum processing time from the start of the transmission.

Figure 9:
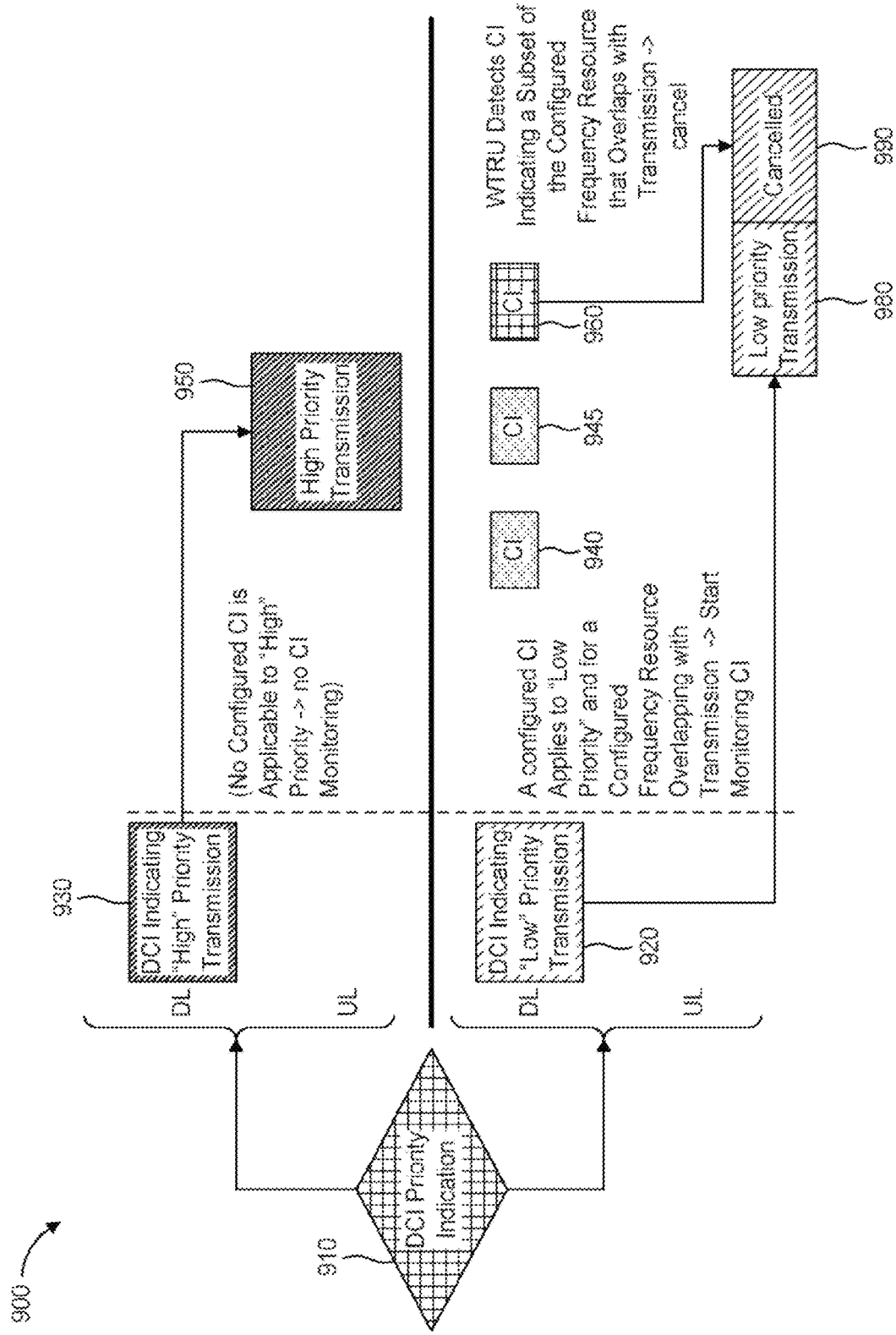
FIG. 9 is a diagram illustrating an example of a WTRU canceling an uplink transmission based on a (CI) cancelation indication.

FIG. 9 is a diagram illustrating an example of a WTRU canceling an uplink transmission based on a CI. As shown in an example in diagram 900, a WTRU may receive a higher layer configuration for a CI. Specifically, the WTRU may receive a first higher layer configuration for a CI, including a set of reference frequency resources. In a further example, the first higher layer configuration may include an applicable maximum priority. Further, in case the priority index of a transmission may be one of two possible values, the higher layer configuration may indicate whether the CI is applicable to a transmission of low priority only, or to transmissions irrespective of its priority level. In an example, a low priority may apply to a priority index of 0.

Further, the WTRU may receive a grant indicating a frequency allocation and a time allocation for a scheduled transmission. Also, the grant may include a priority indication or priority index. In examples, the grant may include at least one of downlink control information (DCI), a dynamic grant, a configured grant, radio resource control (RRC) signaling, or a second higher layer configuration.

In an example, the WTRU may receive a DCI including a priority indication or a priority index. The DCI may indicate that the WTRU is scheduled to perform a transmission. In an example, the priority indication or the priority index may indicate the priority of the scheduled transmission. Further, the DCI may indicate the resources allocated for a scheduled transmission. For example, the DCI may indicate the frequency allocation of a scheduled transmission. Moreover, the DCI may indicate the time allocation of the scheduled transmission.

In an example, the WTRU may determine if the WTRU is scheduled to perform a high priority transmission or a low priority transmission 910. If the WTRU is scheduled perform a high priority transmission 930, the WTRU may transmit a high priority transmission based on the DCI 950. Accordingly, no configured CI may be applicable to such a high priority transmission. Further, the WTRU may not monitor for a CI if a high priority transmission is scheduled. Further the WTRU may not interrupt its scheduled high priority transmission. In an example, the high priority transmission may be a transmission made on a PUSCH. In another example, the high priority transmission may be a transmission made on a PUCCH. In an example, the high priority transmission may be a URLLC transmission.

If the WTRU is scheduled perform a low priority transmission 920, then WTRU may detect a CI 960. The WTRU may receive CI 960 and may decode the CI. Further, the CI may indicate that configured resources overlap with the scheduled transmission. In an example, the configured resources may be frequency resources. In a further example, the CI 960 may indicate that a set or subset of configured resources overlap with the scheduled transmission. For example, the CI 960 may indicate a subset of frequency resources of the set of reference frequency resources for each of a set of time symbols, wherein the scheduled transmission is canceled on the subset of frequency resources overlapping with the frequency allocation for the scheduled transmission. In an example, the scheduled transmission may be canceled on a condition that the subset of frequency resources of a set of time symbols overlaps with the frequency allocation and the time allocation for the scheduled transmission. In a specific example, the entire the scheduled transmission may be so canceled. In a further example, the CI may include the applicable maximum priority.

Accordingly, the WTRU may transmit part of a low priority transmission 980 and interrupt or cancel that part of the transmission or all of the transmission 990 indicated as overlapping by the CI. In an example, the low priority transmission may be a transmission made on a PUSCH. In another example, the low priority transmission may be a transmission made on a PUCCH. Also, the transmission may be a URLLC transmission. Additionally or alternatively, the transmission may be an eMBB transmission.

In a further example, the WTRU may start monitoring for a CI before receiving CI 960. For example, CI 940 and CI 945 may be sent by the network to other WTRUs, and the WTRU may determine not to use CI 940 and CI 945. In an additional example, the WTRU may start monitoring for a CI on a condition that the frequency allocation of the WTRU transmission overlaps with the reference frequency resources. In an further example, the WTRU may start monitoring for a CI on a condition that the priority of WTRU transmission is less than or equal to the applicable maximum priority.

Further, the grant may include a priority index and the scheduled transmission may be interrupted on a further condition that the priority index of the transmission is determined to be lower than an applicable maximum priority. Also, the first higher layer configuration may include the applicable maximum priority. In addition, the first higher layer configuration may include a first indication. Also, the determination that the priority index of the transmission is lower than an applicable maximum priority may be based on receipt of the first indication. In an example, the WTRU may cancel all or part of a scheduled transmission indicated as overlapping on a condition that the priority of the scheduled transmission is less than or equal to the applicable maximum priority. In a further example, the WTRU may interrupt a scheduled transmission indicated as overlapping on a condition that the priority of the scheduled transmission is less than or equal to the applicable maximum priority.

In addition, the first higher layer configuration may include a second indication and wherein the scheduled transmission is interrupted based on receipt of the second indication.

In an example, a lower priority may be indicated by a lower numerical value in the priority indication. For example, a lower priority may be indicated by a 1 and a higher priority may be indicated by a 0.

In another example, a higher priority may be indicated by a lower numerical value in the priority indication. For example, a higher priority may be indicated by a 1 and a lower priority may be indicated by a 0.

In an example, the WTRU may cancel all or part of a scheduled transmission indicated as overlapping on a condition that the priority of the scheduled transmission is less than or equal to the priority of a transmission scheduled by another WTRU. In a further example, interrupt a scheduled transmission indicated as overlapping on a condition that the priority of the scheduled transmission is less than or equal to the priority of a transmission scheduled by another WTRU.

In certain example scenarios, the network may not be aware that a WTRU has cancelled a PUSCH transmission, for example, when the transmission has not yet started for a configured grant for an eMBB WTRU. After receiving a CI for an initial transmission intended for a configured grant, if the WTRU determines that it cannot use such configured grant resource(s), the WTRU may perform at least one of the following processes.

A WTRU may trigger a new buffer status report (BSR) or a new SR, for example, for the highest priority LCH that mapped to the cancelled PDU. Such a new BSR or new SR may further depend on whether a pending BSR or SR was cancelled due to inclusion of a BSR MAC CE in the cancelled PDU. For example, the WTRU may trigger a new BSR instead of a BSR that was cancelled due inclusion of a BSR MAC on a PDU dropped because of inter-WTRU cancellation.

A WTRU may generate an autonomous retransmission for the cancelled PDU on the next CG occasion for a CG with the same TBS. If the WTRU has stored the PDU in a certain HARQ process identity (PID) buffer, the WTRU may generate the autonomous retransmission on the next CG occasion applicable to that HARQ PID. If the WTRU has not stored the PDU in a certain HARQ PID buffer, the WTRU may select an applicable upcoming CG occasion with the same or a different HARQ process.

A WTRU may start a certain timer. After stopping the timer or timer expiry the WTRU may perform any of the above actions. The WTRU may stop such timer upon receiving a dynamic grant applicable for the cancelled PDU, for example, indicating the same HARQ PID.

Further, a WTRU may start the configured grant timer applicable to the configured grant initially selected for the cancelled transmission and the corresponding HARQ process ID. Also, the WTRU may keep the RV number used for the cancelled PDU.

In certain example scenarios, the WTRU may mis-decode the resource allocation indicated by the cancellation indication. The WTRU may erroneously cancel the transmission, though the network is not aware of the cancellation. After receiving a cancellation indication and/or cancelling a certain transmission, the WTRU may perform at least one of the following procedures.

A WTRU may trigger a new BSR or a new SR, for example, for the highest priority LCH that mapped to the cancelled PDU. Such a new BSR or a new SR may further depend on whether a pending BSR or SR was cancelled due to inclusion of a BSR MAC CE in the cancelled PDU.

A WTRU may generate an autonomous retransmission for the cancelled PDU on the next CG occasion for a CG with the same TBS. If the WTRU has stored the PDU in a certain HARQ PID buffer, the WTRU may generate the autonomous retransmission on the next CG occasion applicable to that HARQ PID. If the WTRU has not stored the PDU in a certain HARQ PID buffer, the WTRU may select an applicable upcoming CG occasion with a different HARQ process.

A WTRU may start a certain timer. After stopping the timer or timer expiry, the WTRU may perform any of the above actions. The WTRU may stop such timer upon receiving a dynamic grant applicable for the cancelled PDU, for example, indicating the same HARQ PID.

Efficient monitoring details may be configured in examples provided herein. To reduce the monitoring overhead, the network or base station may combine types of transmissions to the WTRU.

Figure 10:
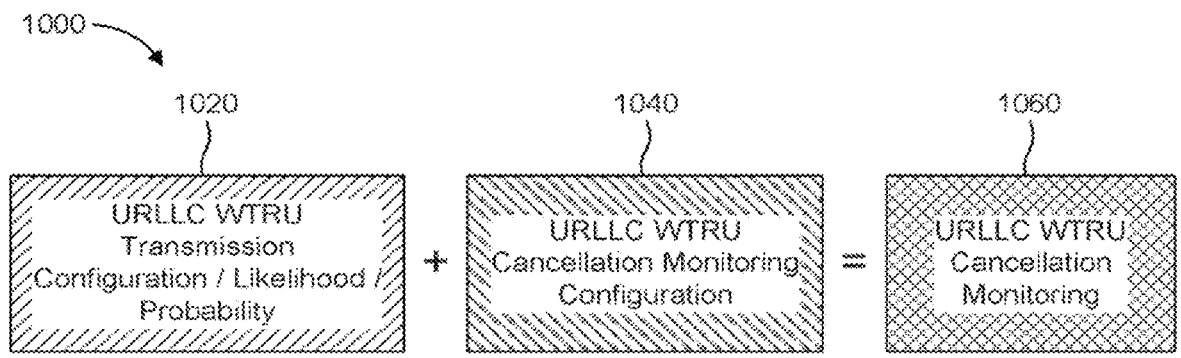
FIG. 10 is a diagram illustrating an example of URLLC WTRU cancellation monitoring.

FIG. 10 is a diagram illustrating an example of URLLC WTRU cancellation monitoring. As shown in diagram 1000, to reduce the monitoring overhead on the eMBB WTRU for the GC-PDCCH signaling in UL cancellation, the gNB may signal information on the possibility of a URLLC transmission occurring. This may be combined with the CI search space configuration to limit the overall monitoring of the CI to resources in which there may be a URLLC WTRU transmission. For example, the gNB may combine information regarding a URLLC WTRU transmission configuration likelihood or probability 1020 with a URLLC WTRU cancellation monitoring configuration 1040 to create a URLLC WTRU cancellation monitoring message 1060.

Figure 11:
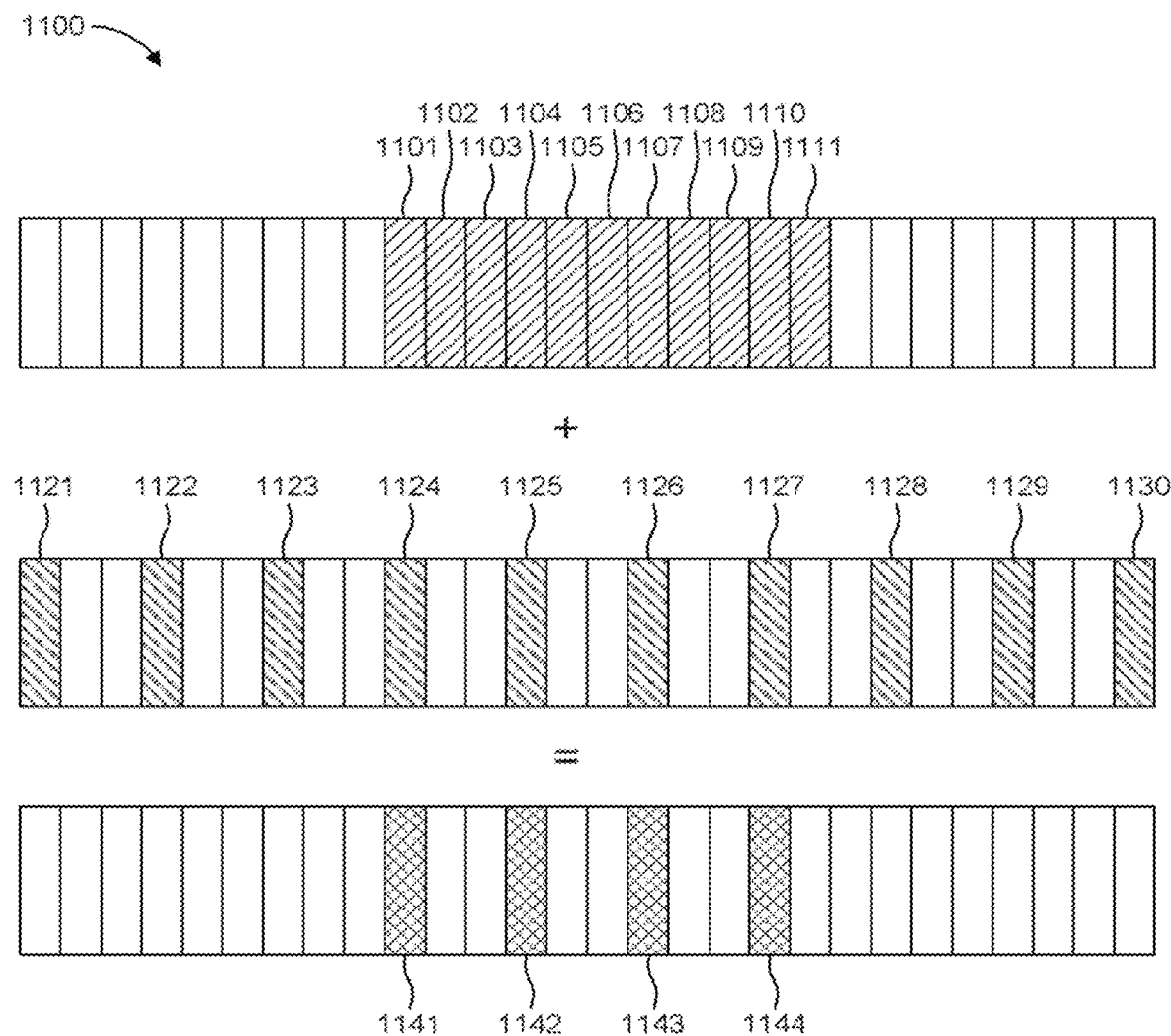
FIG. 11 is a diagram illustrating an example of efficient cancellation monitoring.

FIG. 11 is a diagram illustrating an example of efficient cancellation monitoring. As shown in an example in diagram 1100, the WTRU, rather than having 10 monitoring occasions, such as occasions 1121 through 1130, only has 4 monitoring occasions, such as occasions 1141 through 1144, based on a combination of the URLLC WTRU cancellation monitoring configuration, occasions 1121 through 1130, with the URLLC WTRU transmission configuration, occasions 1102 through 1111.

The URLLC WTRU transmission configuration may be sent dynamically to the eMBB WTRU using a WTRU specific signal. For example, the WTRU specific signal may be a WTRU-specific PDCCH. In a further example, the WTRU specific signal may be part of the DCI scheduling the WTRU. The URLLC WTRU transmission configuration may be sent dynamically to the eMBB WTRU using a group signal, for example, a GC-PDCCH. The URLLC WTRU transmission configuration may be sent semi-statically or statically to the eMBB WTRU using an RRC configuration or a MAC-CE transmission. This signal may indicate parameters such as the start, stop, periodicity and/or frequency resources of a CG or dynamic grant (DG) URLLC transmission that may possibly interrupt the transmission of a CG or DG eMBB WTRU.

The following example scenarios may be utilized.

| eMBB WTRU | URLLC WTRU |
| --- | --- |
| Configured Grant (CG) | Configured grant (CG) |
| Configured Grant (CG) | Dynamic Grant (DG) |
| Dynamic Grant (DG) | Configured Grant (CG) |
| Dynamic Grant (DG) | Dynamic Grant (DG) |

For eMBB CG WTRU and URLLC CG WTRU with a possible cancellation, an eMBB CG WTRU scheduled in resources that have been configured for a URLLC CG WTRU may monitor for the cancellation indication only within the resources where there is overlap. The eMBB CG WTRU may need signaling to identify the resources in which the URLLC CG WTRU may transmit. This may enable it to monitor for the cancellation signal when there is overlap and reduce the monitoring overhead. The signaling to the eMBB WTRU may include parameters such as the frequency resources, the time resources or duration of transmission and the periodicity of the URLLC WTRU CG resources.

For both Type 1 and Type 2 configured grant scheduling for the eMBB CG WTRU, the information may be signaled as part of the RRC configuration signaling, Type 1, or activation signaling, Type 2. This may be especially applicable in the case that the eMBB CG WTRU is configured or activated after the URLLC WTRU is configured or activated. For both Type 1 and Type 2 configured grant scheduling for the eMBB WTRU, the information may be explicitly signaled to the eMBB CG WTRU as an additional monitoring configuration. This may be especially applicable in the case that the eMBB CG WTRU is configured or activated before the URLLC WTRU is configured or activated. It may also be applicable in the case that the design wishes to keep the cancellation monitoring configuration/activation separate from the transmission configuration/activation.

In one example, the eMBB DG WTRU, or set of eMBB DG WTRUs, may receive a monitoring activation/deactivation signal at configured or pre-defined times indicating the resources in which cancellation monitoring should be activated or deactivated. The eMBB CG WTRU, or set of eMBB CG WTRUs, may monitor for cancellation when the URLLC resources are active.

Figure 12:
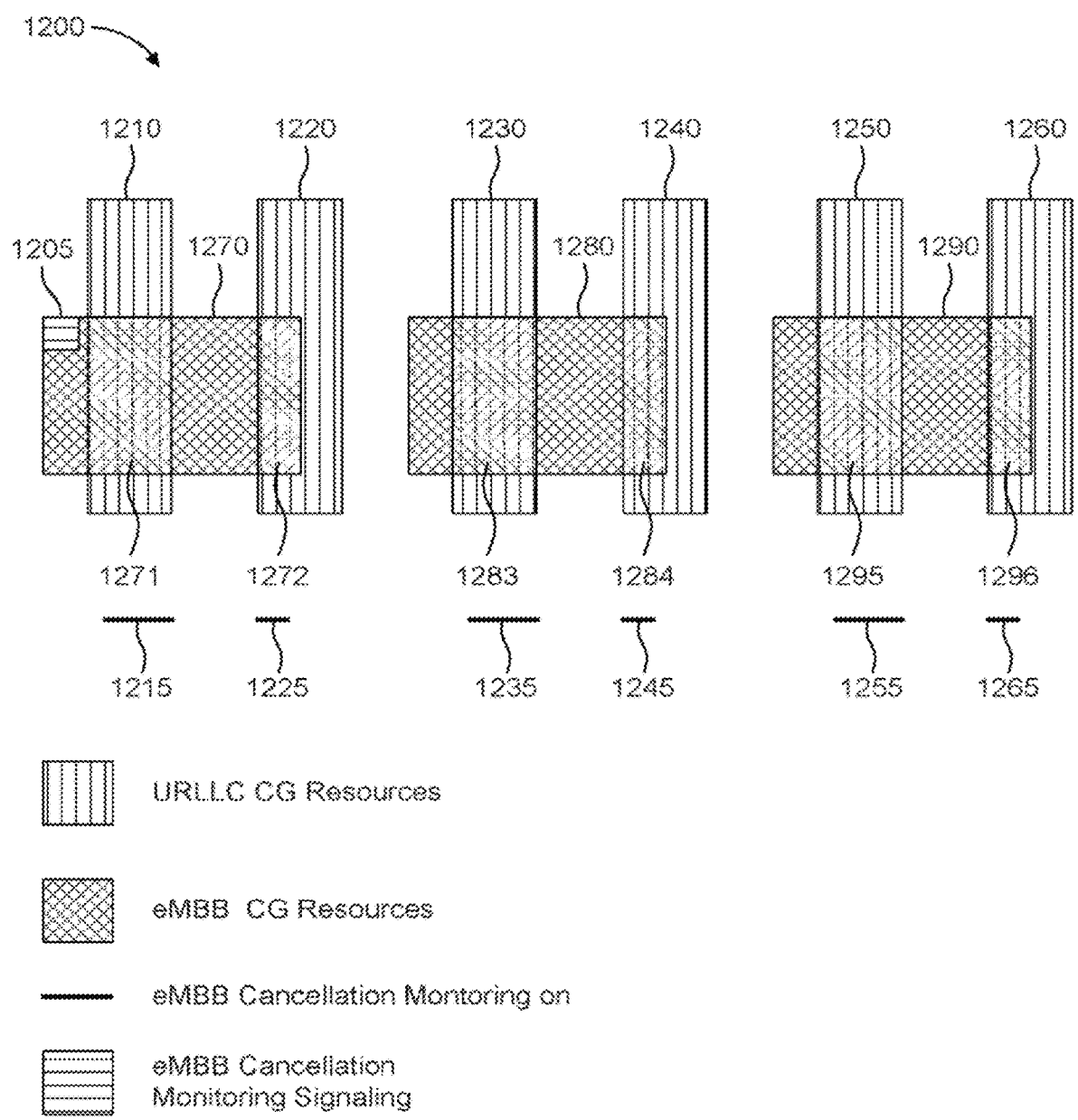
FIG. 12 is a diagram illustrating an example of an eMBB CG WTRU and an URLLC CG WTRU with cancellation monitoring.

FIG. 12 is a diagram illustrating an example of an eMBB CG WTRU and an URLLC CG WTRU with cancellation monitoring. As shown in an example in diagram 1200, an eMBB WTRU may receive eMBB cancellation monitoring signaling 1205. The monitoring signaling may identify URLLC CG resources, such as URLLC CG resources 1210, 1220, 1230, 1240, 1250, 1260 on which the URLLC CG WTRU may transmit. The eMBB CG resource, such as eMBB CG resources 1270, 1280, 1290 may overlap with the URLLC CG resources, such as at overlapping resources 1271, 1272, 1283, 1284, 1295, 1296, which enable the eMBB CG WTRU to monitor for the cancelation, or turn eMBB cancellation monitoring on, at 1215, 1225, 1235, 1245, 1255, 1265.

Figure 13:
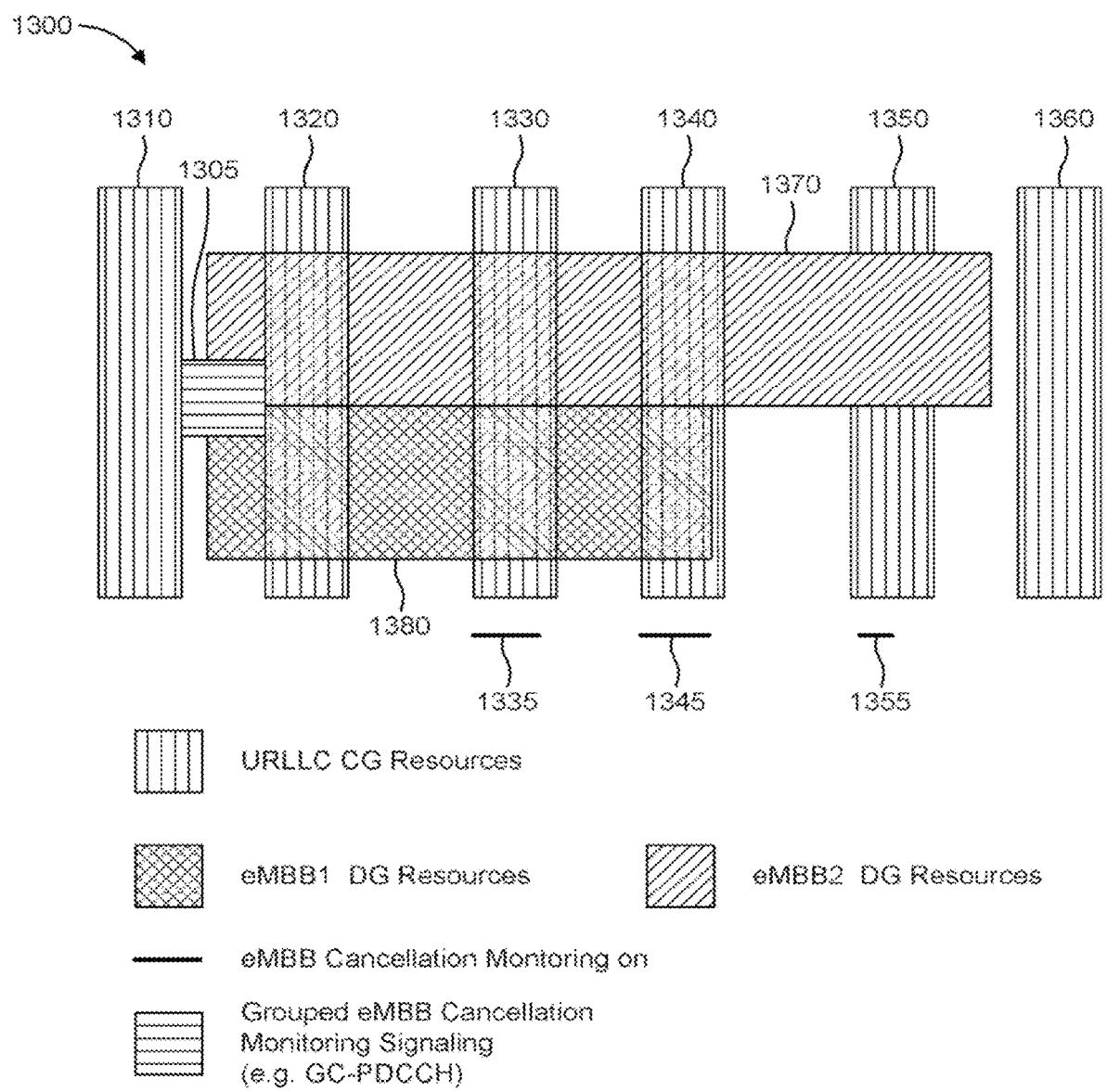
FIG. 13 is a diagram illustrating eMBB DG WTRUs and an URLLC CG WTRU with cancellation based on configured times.

FIG. 13 is a diagram illustrating eMBB DG WTRUs and an URLLC CG WTRU with cancellation based on configured intervals. As shown in an example in diagram 1300, for an eMBB DG WTRU and an URLLC CG WTRU with cancellation, an eMBB DG WTRU may be scheduled in resources that have been configured for an URLLC CG WTRU. Further, the eMBB DG WTRU may monitor for the cancellation indication only within the resources where they overlap. The eMBB DG WTRU may need signaling to identify the resources in which the URLLC CG WTRU may transmit. This enables the monitoring for the cancellation signal when there is overlap and reduce the monitoring overhead. The signaling to the eMBB WTRU may include parameters such as the frequency resources, the time resources or duration of transmission and the periodicity of the URLLC WTRU CG resources. Note that the periodicity may be needed in the case that the eMBB resources may span over multiple URLLC CG WTRU transmissions.

The information may be explicitly signaled to the eMBB DG WTRU as an additional monitoring configuration or as part of the DCI scheduling the DG transmission, for example, WTRU-specific signaling. The information may explicitly be sent to all eMBB WTRUs, such as both CG WTRUs and DG WTRUs, simultaneously and the eMBB WTRUs may combine this information with their scheduling information to decide if cancellation monitoring may be activated in certain resources. For example, the information may be group signaling such as GC-PDCCH signaling or a group based sequence. In an example, the information may be grouped eMBB cancellation monitoring signaling 1305, such as GC-PDCCH signaling.

In this case, the gNB may send signaling at appropriate intervals to inform all the WTRUs about the cancellation monitoring resources for the subsequent duration. In one example, the eMBB DG WTRU, or set of eMBB DG WTRUs, may receive a monitoring activation/deactivation signal at configured or pre-defined times indicated the resources in which cancellation monitoring should be activated or deactivated. For example, a URLLC CG WTRU may be scheduled with URLLC CG resources 1310, 1320, 1330, 1340, 1350, 1360, a first eMBB DG WTRU may be scheduled with eMBB DG resources 1370, and a second eMBB DG WTRU may be scheduled with eMBB DG resources 1380. The first eMBB DG WTRU and the second eMBB DG WTRU may perform cancellation monitoring on 1335, 1345, 1355.

In an example, eMBB CG WTRUs may use cancellation of resources based on URLLC DG WTRU resources which are off-limits to the URLLC DG WTRU. In an example, an eMBB CG WTRU that may have a URLLC DG WTRU scheduled in the resources that it transmits in may need to monitor for a cancellation indication within the resources in which there may be overlap. The eMBB CG WTRU may need signaling to identify the resources in which the URLLC DG WTRU may transmit. The scheduling may enable the eMBB CG WTRU to monitor for the cancellation signal when there is overlap and reduce the monitoring overhead. The signaling to the eMBB WTRU may include parameters such as the frequency resources and the time resources within which the URLLC DG WTRU may be scheduled.

The resources dedicated to the eMBB CG WTRU may be set as off-limits to the URLLC DG WTRU to prevent the need for the eMBB CG WTRU to have to monitor for a cancellation indication. Also, the resources dedicated to the eMBB CG WTRU may be set as allowable to the URLLC DG WTRU to ensure that the eMBB CG WTRU may always monitor for a cancellation indication. The resources dedicated to the eMBB CG WTRU may be partitioned to have resources both off-limits and allowable to the URLLC DG WTRU to ensure that the eMBB CG WTRU may always monitor for a cancellation indication within the allowable resource.

In an example, the signaling to enable the identification of the allowable resources and off-limits resources may be WTRU specific. For example, the allowable/off-limits resources may be configured as part of the CG configuration, and may be WTRU specific. In a further example, the signaling to enable this may be common to multiple WTRUs, a GC-PDCCH signal.

Figure 14:
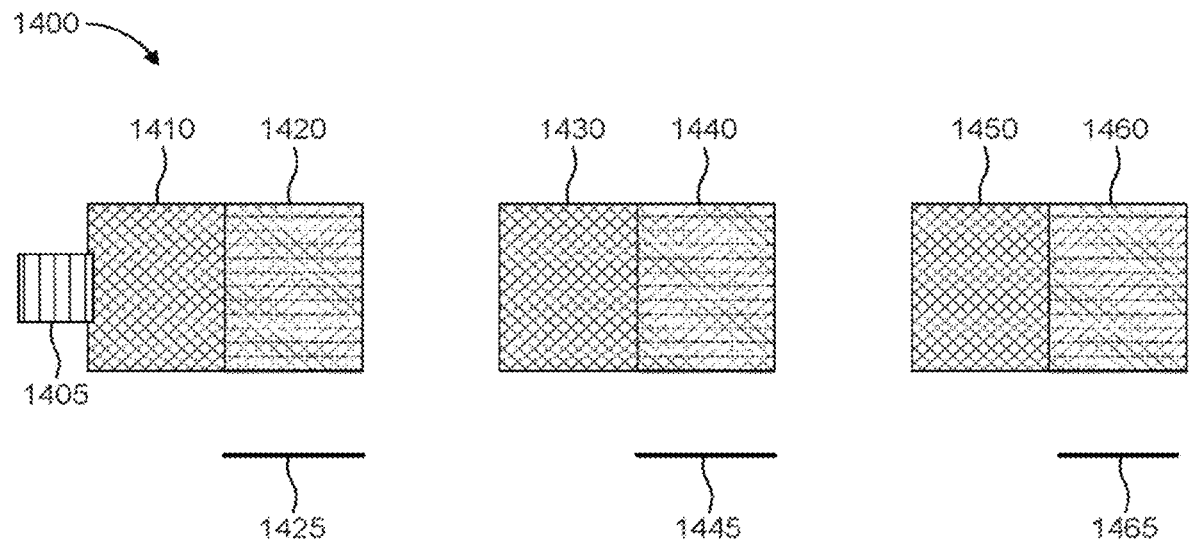
FIG. 14 is a diagram illustrating an eMBB CG WTRUs and an URLLC DG WTRU with cancellation using allowable resources and off-limits resources, and with a WTRU specific configuration.

FIG. 14 is a diagram illustrating an eMBB CG WTRUs and an URLLC DG WTRU with cancellation using allowable resources and off-limits resources, and with a WTRU specific configuration. As shown in an example in diagram 1400, an eMBB CG WTRU may receive a CG configuration including allowable and off-limits resources 1405. The configuration 1405 may set eMBB CG resources 1410, 1430, 1450, as off-limits to URLLC DG WTRU transmission and may set eMBB CG resources 1420, 1440, 1460 as allowable to URLLC DG WTRU transmission. Accordingly, the eMBB DG WTRU may perform cancellation monitoring on 1425, 1445, 1465.

Figure 15:
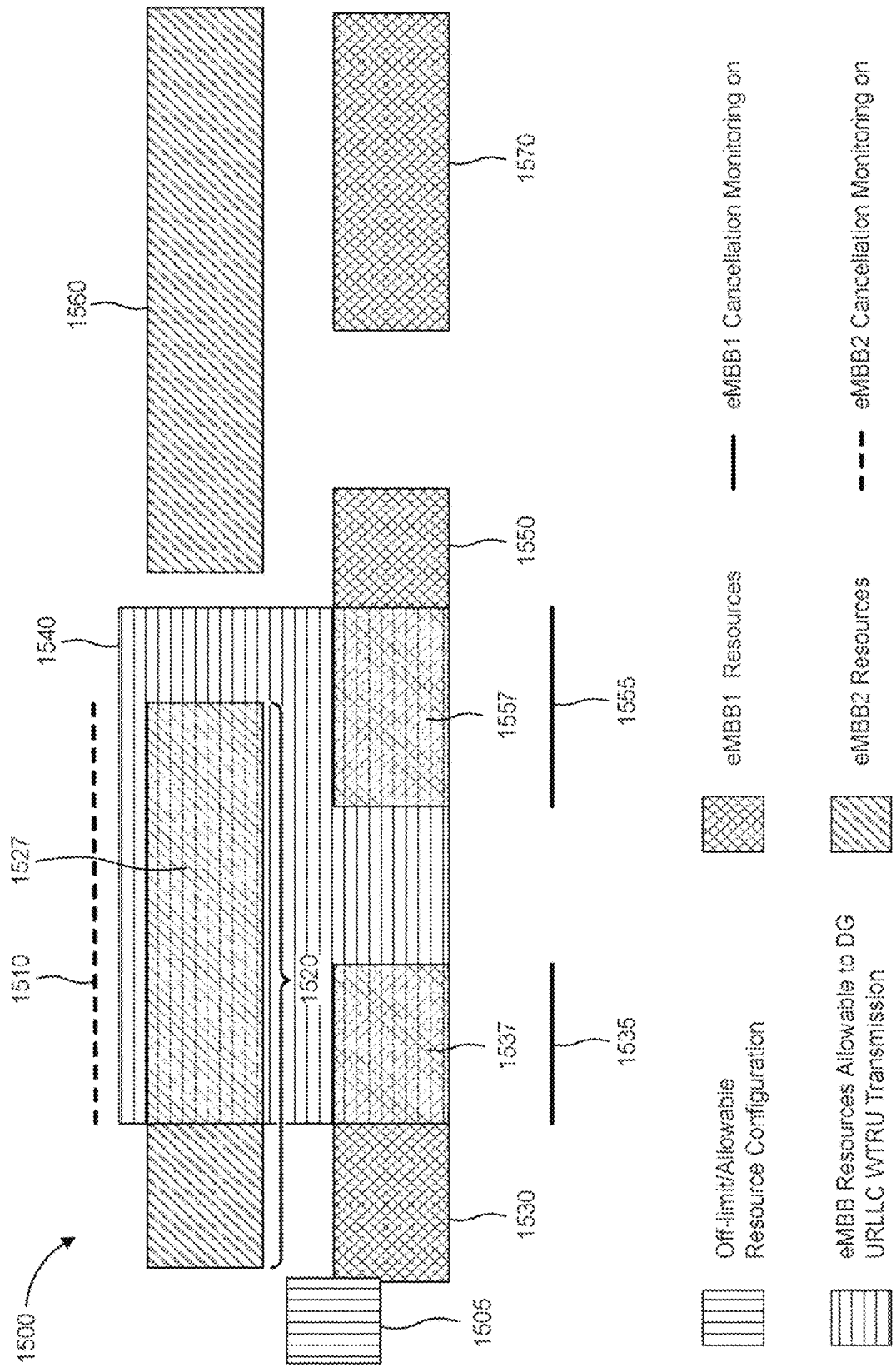
FIG. 15 is a diagram illustrating eMBB CG WTRUs and an URLLC DG WTRU with cancellation using allowable resources and off-limits resources, and with a grouped WTRU configuration.

FIG. 15 is a diagram illustrating eMBB CG WTRUs and an URLLC DG WTRU with cancellation using allowable resources and off-limits resources, and with a grouped WTRU configuration. As shown in an example in diagram 1400, eMBB CG WTRUs may receive a configuration including allowable and off-limits resources 1505. In an example, the configuration 1505 may be signaled by a GC-PDCCH. The configuration 1505 may schedule resources 1530, 1550, 1570 as eMBB CG resources for a first eMBB WTRU and may schedule resources 1520, 1560 as eMBB CG resources for a second eMBB WTRU. Further, configuration 1505 may set eMBB CG resources 1540 as allowable to URLLC DG WTRU transmission. For example, for the first eMBB WTRU, resources 1537 of eMBB CG resources 1530 and resources 1557 of eMBB CG resources 1550 may be set as allowable. Further, for the second eMBB WTRU, resources 1527 of eMBB CG resources 1520 may be set as allowable. Accordingly, the first eMBB DG WTRU may perform cancellation monitoring on 1535, 1555 and the second eMBB DG WTRU may perform cancellation monitoring on 1510. The above examples may also be applicable to the eMBB DG WTRU-URLLC DG WTRU scenario.

For examples using an eMBB DG WTRU and a URLLC DG WTRU with cancellation, an eMBB DG WTRU that has a URLLC DG WTRU scheduled in its resources may need to monitor for a cancellation indication within the resources in which they may overlap. The eMBB DG WTRU may need signaling to identify the resources in which the URLLC DG WTRU may transmit. The signaling may enable eMBB DG WTRU to monitor for the cancellation signal when there is overlap and reduce the monitoring overhead. The signaling to the eMBB WTRU may include parameters such as the frequency resources and the time resources within which the URLLC DG WTRU may be scheduled.

The resources in which the eMBB DG WTRU may transmit may be set as off-limits to the URLLC DG WTRU to prevent the need for the eMBB DG WTRU to have to monitor for a cancellation indication. The resources in which the eMBB DG WTRU may transmit may be set as allowable to the URLLC DG WTRU to ensure that the eMBB DG WTRU may always monitor for a cancellation indication.

The resources in which the eMBB DG WTRU may transmit may be partitioned to have resources both off-limits and allowable to the URLLC DG WTRU to ensure that the eMBB DG WTRU may monitor for a cancellation indication within the allowable resource only. The signaling to enable this may be WTRU specific, in an example. The allowable/off-limits resources may be sent as part of the DCI scheduling the transmission. The signaling to enable this may be common to multiple WTRUs, such as a GC-PDCCH, and may be signaled by a separate mechanism as shown in FIG. 15.

Methods for autonomous hybrid power control and UL cancellation by WTRU are described herein. For the case of grantless uplink transmission by a URLLC WTRU, for example, a configured grant, sending a cancellation indication from the gNB at the beginning of the transmission is not practical as the gNB has to know whether a URLLC WTRU is about to use the resource. One solution to support inter-WTRU UL multiplexing between URLLC and eMBB WTRUs in this case is to use one or more of power control, different MCS and/or transmission modes for the UL periods and/or slots where UL cancellation indication is not feasible, such as at initial transmission. The gNB may send a UL cancellation signal at a later time during the transmission.

In one example in an embodiment of this method, the URLLC WTRU may be configured with two or multiple UL transmission modes for the grantless UL transmission of PUSCH, for example, a congested mode or an uncongested mode. In an example, each mode may correspond to a set of power control parameters, modulation and coding scheme (MCS) and/or other transmission-related parameters. The selection of congested mode transmission and uncongested mode transmission by the URLLC WTRU may be done based on the absence or presence of the UL cancellation indication, respectively. As an example, in absence of UL cancellation, the URLLC WTRU may start transmission with the transmission parameters corresponding to the congested mode. This start of transmission may include transmitting with a higher power level and/or at a lower rate. In the consecutive slots/mini-slots and/or UL periods, if the URLLC WTRU receives UL scheduling from the gNB, it may switch to grant-based UL transmission with parameters based on the scheduling information. Otherwise, if the URLLC WTRU does not receive its WTRU-specific DCI for UL transmission but the URLLC WTRU detects a UL cancellation indication in a GC-DCI, the URLLC WTRU may continue grantless UL transmission, but using the parameters corresponding to the uncongested transmission mode, as shown in examples below.

Figure 16:
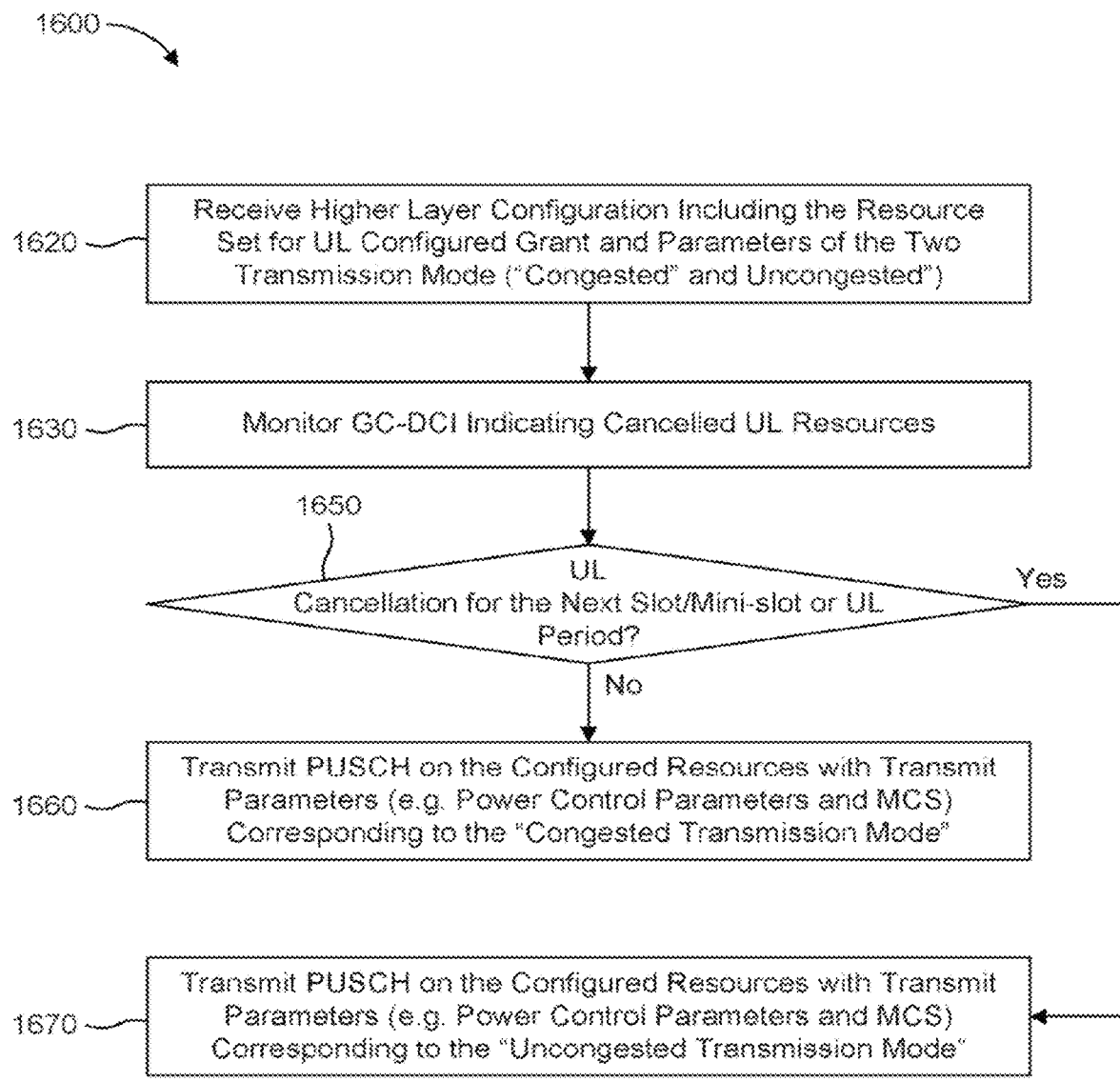
FIG. 16 is a flowchart diagram illustrating an example of a URLLC WTRU procedure for the selection of a transmission mode in grantless UL transmission.

FIG. 16 is a flowchart diagram illustrating an example of a URLLC WTRU procedure for the selection of a transmission mode in grantless UL transmission. As shown in an example in flowchart diagram 1600, the URLLC WTRU may receive a higher layer configuration 1620 including the resource set for a UL configured grant and parameters of the two transmission modes, congested and uncongested. Next, the URLLC WTRU may monitor GC-DCI indicating cancelled UL resources 1630. After that, the URLLC WTRU may determine whether UL cancellation may be for the next slot, min-slot or UL period 1650. If there was no cancellation, the URLLC WTRU may transmit on a PUSCH on the configured resources with transmit parameters, for example, power control parameters and MCS, corresponding to the congested transmission mode 1660. If there was a cancellation, the URLLC WTRU may transmit on a PUSCH on the configured resources with transmit parameters, for example, power control parameters and MCS, corresponding to the uncongested transmission mode 1670.

In an example in this method, the URLLC WTRU may start a new UL grantless transmission with uncongested mode transmission, as long as the previously monitored UL cancellation is still valid. For example, the URLLC WTRU may start grantless uplink transmission in slot 0 and receive the UL cancellation indication in slot 1, indicating UL cancellation for 4 slots, and may finish the transmission of that UL data in slot 1. In this case, the URLLC WTRU may begin another grantless UL transmission with uncongested transmission mode parameters in slot 2, slot 3, or slot 4, as shown in examples below.

Figure 17:
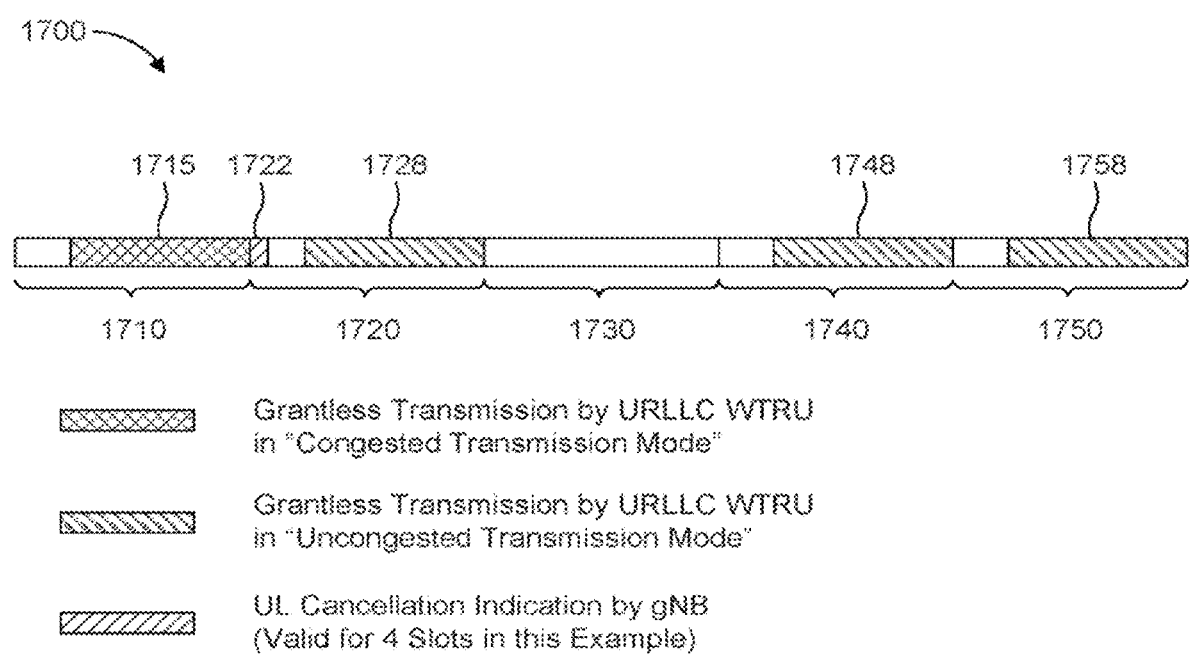
FIG. 17 is a diagram illustrating an example of a grantless UL transmission by a URLLC WTRU in congested and uncongested transmission modes, based on the presence of a UL cancellation indication.

FIG. 17 is a diagram illustrating an example of a grantless UL transmission by a URLLC WTRU in congested and uncongested transmission modes, based on the presence of a UL cancellation indication. As shown in an example in diagram 1700, UL transmission(s) may be made over five slots or parts. In slot 0, or part 1710, a URLLC WTRU may start grantless uplink transmission 1715. Further, in slot 1, or part 1720, a UL cancellation request or cancellation indication 1722 may be sent by a gNB and received by the URLLC WTRU. Slots 2-4, or parts 1730, 1740, 1750 may perform grantless transmission(s) by URLLC WTRU in uncongested transition mode. For example, the URLLC WTRU may transmit grantless transmission 1748 in slot 3, or part 1740. Further, the URLLC WTRU may transmit grantless transmission 1758 in slot 4, or part 1750.

In one method, the URLLC WTRU may switch between congested mode and uncongested mode based on the possible presence of an eMBB WTRU transmission. Further, the URLLC WTRU may switch between congested mode and uncongested mode in a pre-defined time-frequency region after sending a configured grant to the gNB. Moreover, the URLLC WTRU may switch between congested mode and uncongested mode in a possible time-frequency shared region where both eMBB and URLLC traffic may be transmitted simultaneously.

Methods for PRACH cancellation or modification are described herein. One approach to enhance reliability of UL transmission for URLLC users is to allow those users to transmit on the resources that are assigned for eMBB WTRUs to transmit on a PRACH. In this case, there should be some procedure to avoid PRACH transmission by eMBB WTRUs on the occupied resources.

One example in an embodiment includes informing the eMBB WTRUs to modify or adapt their PRACH transmission to avoid collision with the interrupting URLLC transmission. In this method, the eMBB WTRU may be configured with multiple PRACH formats with different corresponding resource sets. As an example, an eMBB WTRU may be configured with two PRACH formats of F1 and F2, where F2 may have a shorter length, and in the case of resource collision for the PRACH resources corresponding to format F1 based on the received UL cancellation indication, the WTRU may determine that it should use F2, as shown below in FIG. 18. This configuration may be done using a SIB2 message or another higher layer signaling. In another example, instead of being configured with PRACH format of F2, the eMBB WTRU may switch to the default PRACH format of Format 0, if the resources corresponding to the configured formant F1 overlap with the cancelled UL resources.

Figure 18:
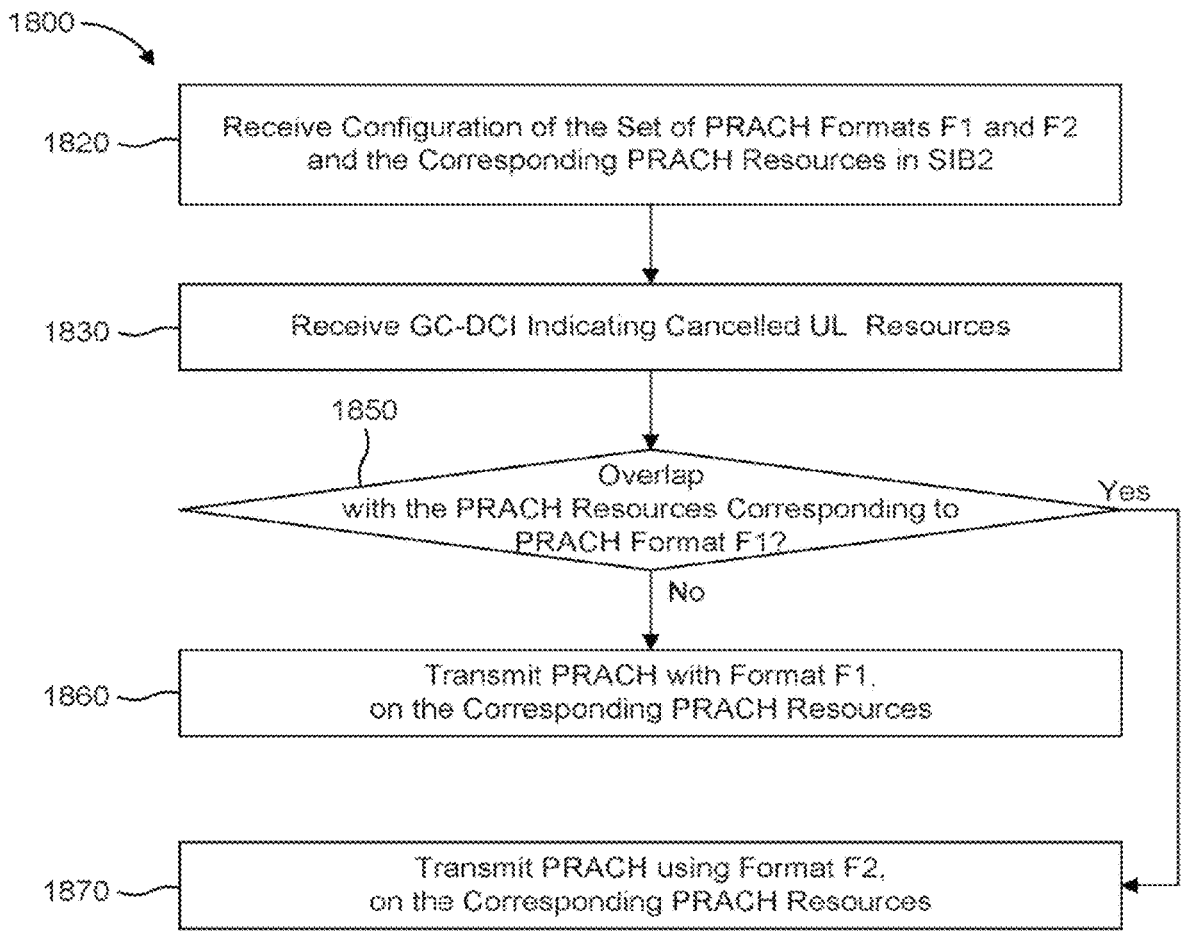
FIG. 18 is a flowchart diagram illustrating an example of a WTRU procedure for adaptation of physical random access channel (PRACH) format and resources based on a dynamic UL cancellation indication.

FIG. 18 is a flowchart diagram illustrating an example of a WTRU procedure for adaptation of PRACH format and resources based on a dynamic UL cancellation indication. As shown in an example in flowchart diagram 1800, the WTRU may receive a configuration of the set of PRACH formats F1 and F2 and the corresponding PRACH resources in a SIB2 message 1820. After that, the WTRU may receive GC-DCI indicating cancelled UL resources 1830. Next, the WTRU may determine if there is overlap with the PRACH resources corresponding to PRACH format F1. If there is no overlap, the WTRU may transmit on a PRACH with format F1, on the corresponding PRACH resources 1860. If there is overlap, the WTRU may transmit on a PRACH using format F2 on the corresponding PRACH resources 1870.

In one example, the PRACH resources for format F2 or the default Format 0 may be a configured as a fixed subset of PRACH resources assigned for format F1. In another example, the resources for format F2 or the default Format 0 may be determined by the WTRU, based on the PRACH resources configured for format F1, and the cancelled uplink resources indicated by a UL cancellation indication. For example, the WTRU may be configured with PRACH format 1 which is associated with time resources of length 3 ms. Inside each PRACH resource of length 3 ms there are 3 possible time resource for PRACH format 0 which has a time resource of length 1 ms. If the WTRU receives the UL cancellation indication and observes overlap with its own configured PRACH resources (associated with format 1), the WTRU may switch to PRACH with the default format 0, and may select the first millisecond, second millisecond or third millisecond of its configured PRACH resource as its effective PRACH resource with format 0, based on the first one that does not overlap with the cancelled UL resources.

Methods for providing a cross-carrier cancellation indication are provided herein. For an eMBB WTRU transmitting uplink data or UCI on a TDD carrier, a timely cancellation indication may be received on a different component carrier. In one method, the WTRU may cancel a transmission on a given carrier upon receiving a cross carrier cancellation indication. The cross-carrier indication may provide any information necessary. For example, the proposed cross-carrier indication may provide the aforementioned contents of the cancellation indication for a single carrier. For example, the proposed cross-carrier indication may provide the carrier index applicable for cancellation.

In another example, the proposed cross-carrier indication may provide a timing offset, which can be explicitly signaled or implicitly determined by the WTRU based on downlink reference timings and/or uplink timing advances of both carriers. For example, the WTRU may determine the timing of cancellation considering a timing offset with respect to the time of receiving the cross-carrier indication. In one example, two carriers may have two reference rasters or reference start times. The WTRU may add the difference between the two rasters and/or uplink timing advances, prior to determining the applicable active resource for cancellation on the indicated carrier. In one example, if the WTRU is configured to start a certain timer upon receiving the cancellation indication on the same carrier, the WTRU may delay starting such timer by the time offset if the cancellation indication is a cross-carrier indication. In another example, the WTRU may subtract the timing offset from the initial timer value prior to starting the timer, if the cancellation indication is a cross-carrier indication. The timing offset may also consider the minimum processing times of the WTRU on each component carrier. The minimum processing times may be different based on, for example, the numerologies of the component carriers or the bands they are located in.

In another example, the proposed cross-carrier indication may provide an indication for the WTRU to determine whether the cancellation is applicable to the same carrier on which the cancellation indication is received or a different carrier.

The WTRU may monitor the PDCCH for the cross-carrier indication on the GC-PDCCH or a WTRU specific PDCCH. The carrier index applicable for cancellation may be indicated to the WTRU in a number of ways.

For example, the carrier index applicable for cancellation may be indicated to the WTRU explicitly. The index of the component carrier may be explicitly indicated. In one example, the WTRU may be configured by RRC with a subset of component carriers applicable for inter-WTRU cancellation. The UE may receive a DCI indicating one of the carriers configured by RRC for inter-WTRU cancellation. The WTRU may determine a codebook to map carriers applicable for inter-WTRU cancellation to DCI entries. For example, if the RRC configures the WTRU with 6 carriers as applicable for inter-WTRU cancellation, the WTRU may determine a codebook of 3 bits to determine the carrier index. Additionally or alternatively, the WTRU may decode the applicable carrier from a bitmap indicated in the DCI, which indicates which carrier or carriers are applicable for cancellation.

For example, the carrier index applicable for cancellation may be indicated to the WTRU implicitly based on a property of the PDCCH. For example, the WTRU may determine the index of a component carrier applicable for cancellation based on a property of the PDCCH on which the cross-carrier cancellation indication is received, including but not limited to: PDCCH resource, coreset(s), search spaces(s), PDCCH periodicity, DCI format, and/or RNTI used to decode the PDCCH. In one example, the WTRU may be configured by RRC signaling with a subset of component carriers applicable for inter-WTRU cancellation. The WTRU may be further configured by RRC signaling with a mapping table between component carriers and PDCCH properties, for example, coresets or PDCCH resources. The WTRU may determine the component carrier index for which the cancellation indication is applicable from the coreset on which the cross-carrier indication is received.

For example, the carrier index applicable for cancellation may be indicated to the WTRU implicitly based on a 1-to-1 carrier mapping. For example, the WTRU may determine the index of the component carrier applicable for cancellation from the carrier index on which the cross-carrier indication is received. The WTRU may further monitor the cancellation indication on a given carrier as a function of the carrier index on which the transmission is scheduled. For example, the WTRU may be configured by RRC signaling with a mapping between CC x and CC y, such that any indication received on CC x implies it is applicable to CC y, possibly in addition to CC x itself. For an eMBB WTRU scheduled on CC y, the WTRU may monitor the PDCCH for a cross carrier indication on CC x.

In an example case where cross carrier cancellation is supported, the WTRU may indicate the minimum processing time needed to process the PDCCH, switch carriers and stop WTRU transmission. If the architecture is such that the WTRU may monitor the carrier carrying the indication while transmitting, the minimum processing time may be less than the case where it may only transmit or receive in the same direction on the multiple carriers. The WTRU may communicate the minimum processing time explicitly or may communicate its carrier aggregation capability and have the gNB infer its minimum processing time.

Methods for orthogonal DMRS transmission to enable minimum mean square estimation (MMSE)-SIC support in power-based multiplexing are disclosed herein. Also, methods to ensure DMRS orthogonality in power-based inter-WTRU multiplexing and prioritization are disclosed herein.

For enhanced power control, in the resources where the eMBB WTRU and the URLLC WTRU overlap, there may be negligible loss in performance for both the eMBB WTRU and the URLLC WTRU if there are orthogonal DMRSs between the eMBB WTRU and the URLLC WTRU. In examples provided herein, methods are proposed to ensure the DMRS of both the eMBB WTRUs and the URLLC WTRUs are transmitted in an orthogonal manner in the overlapping resources. As such, examples herein provide a beneficial mechanism to ensure that the DMRSs of the eMBB WTRU and the URLLC WTRU are mutually orthogonal.

In one example solution, the eMBB WTRU may be configured with a possible set of URLLC WTRU DMRS transmission locations and the eMBB WTRU may skip transmitting in these specific resources. Further, the eMBB WTRU may transmit an orthogonal DMRS of its own in these resources.

These pre-defined locations may be one of the following. The pre-defined locations may be semi-statically configured and signaled to either or both of the eMBB WTRUs and URLLC WTRUS. The pre-defined locations may be semi-statically configured and dynamically signaled to either or both of the eMBB WTRUs and URLLC WTRUs. The pre-defined locations may be dynamically configured and signaled to either or both of the eMBB WTRUs and URLLC WTRUS.

Figure 19:
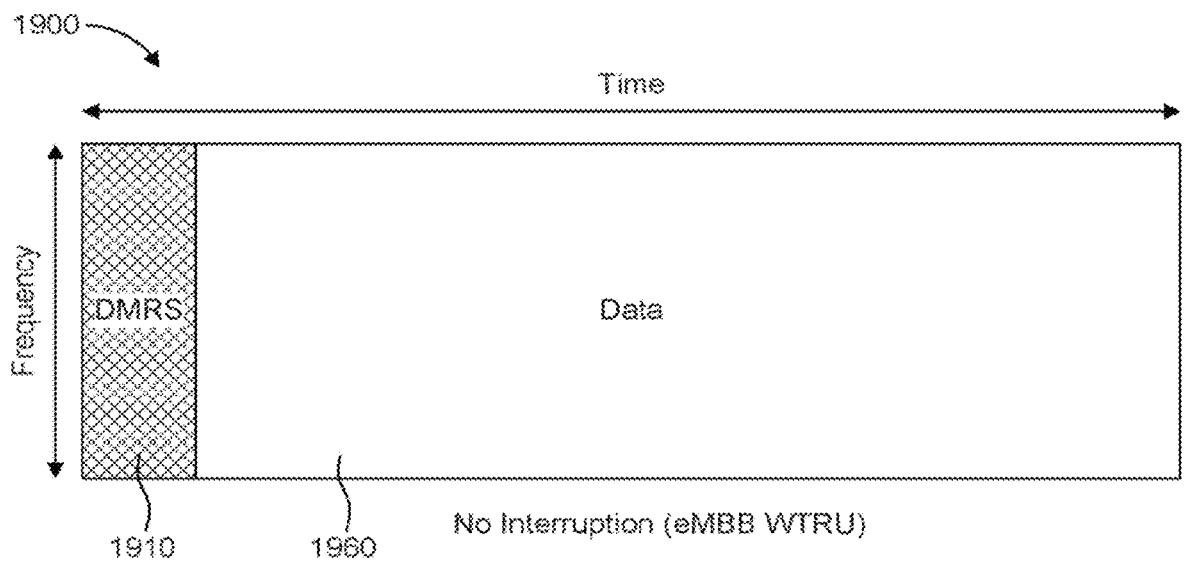
FIG. 19 is a diagram illustrating an example of no interruption and an eMBB WTRU transmitting for an entire scheduled duration.

FIG. 19 is a diagram illustrating an example of no interruption and the eMBB WTRU transmitting for an entire scheduled duration. In an example shown in diagram 1900, the eMBB WTRU may transmit a DMRS 1910. Further, the eMBB WTRU may transmit data without interruption for the entire schedule duration 1960.

Figure 20:
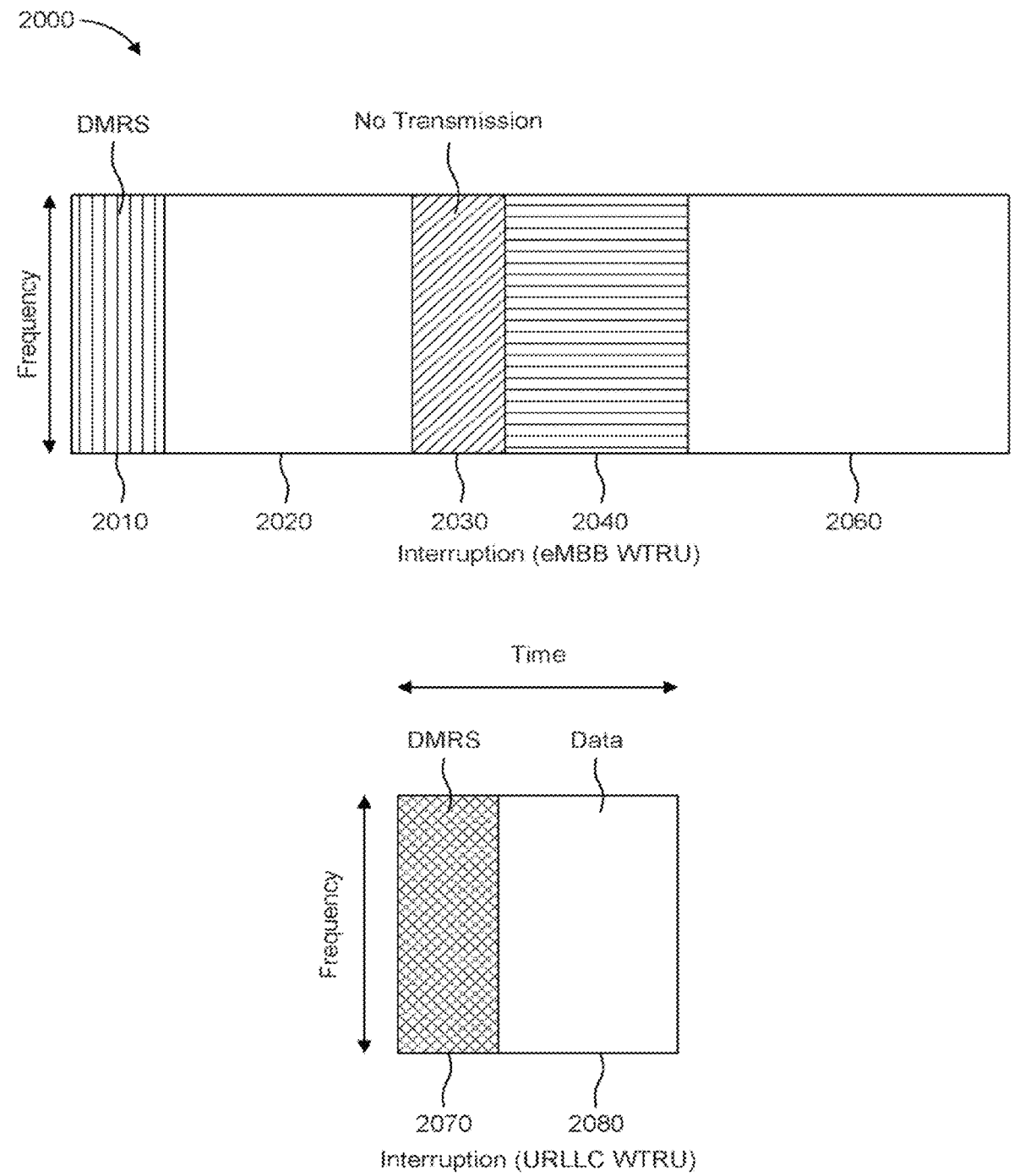
FIG. 20 is a diagram illustrating an example of interruption and an eMBB WTRU skipping transmitting in the resource occupied by a URLLC WTRU.

FIG. 20 is a diagram illustrating an example of interruption and the eMBB WTRU skipping transmitting in the resource occupied by a URLLC WTRU. As shown in an example in diagram 2000, the eMBB WTRU may transmit a DMRS 2010. Further, the eMBB WTRU may transmit data 2020 and then dynamically pause its own transmission 2030 when the URLLC WTRU transmits its DMRS 2070. Further, the eMBB WTRU may continue the interruption of its transmission 2040 while the URLLC WTRU transmits its data 2080. The eMBB WTRU may then resume transmitting data 2060.

The power levels of the DMRS of the URLLC WTRU may be boosted to improve the channel estimate of the URLLC WTRU in the presence of an interferer. In an example, an eMBB WTRU may dynamically pause its own transmission when the URLLC WTRU transmits its DMRS only and then the eMBB WTRU may resume transmission of its own data. Further, the eMBB WTRU may interrupt its transmission to transmit an additional DMRS at the same time an in the same resources at the URLLC WTRU transmits its DMRS, and then the eMBB WTRU may resume transmission of its own data. In both cases, the gNB may be able to estimate a clean channel for an advanced interference cancellation receiver, for example, a successive interference cancellation receiver. The DMRS transmitted by both WTRUs may be configured to occupy the same time-frequency resources but be orthogonal in the code domain, for example, by an orthogonal cover code. As the URLLC WTRU may typically use a front-loaded DMRS, the new DMRS transmitted by the eMBB WTRU may be the first resource allocated to the URLLC. The eMBB WTRU may then resume transmission of its data preventing the issue of a phase discontinuity in its transmission.

In an example, to enable the eMBB WTRU as to when to make the switch, the eMBB WTRU may receive a cancellation indication or multiplexing indication that indicates the resource to replace and possibly the parameters to use for the DMRS, or for the DMRS configuration. The DMRS configuration may be semi-statically configured.

In the example case that the eMBB WTRU may have a second DMRS configured to transmit in the overlapped resources, one or more of the following may occur. For example, the eMBB WTRU may transmit its second DMRS. The URLLC may transmit an additional orthogonal DMRS in these resources. In another example, the eMBB WTRU may skip transmitting its second DMRS as it has transmitted an additional DMRS in the resource used by the URLLC WTRU for its front loaded DMRS.

Figure 21:
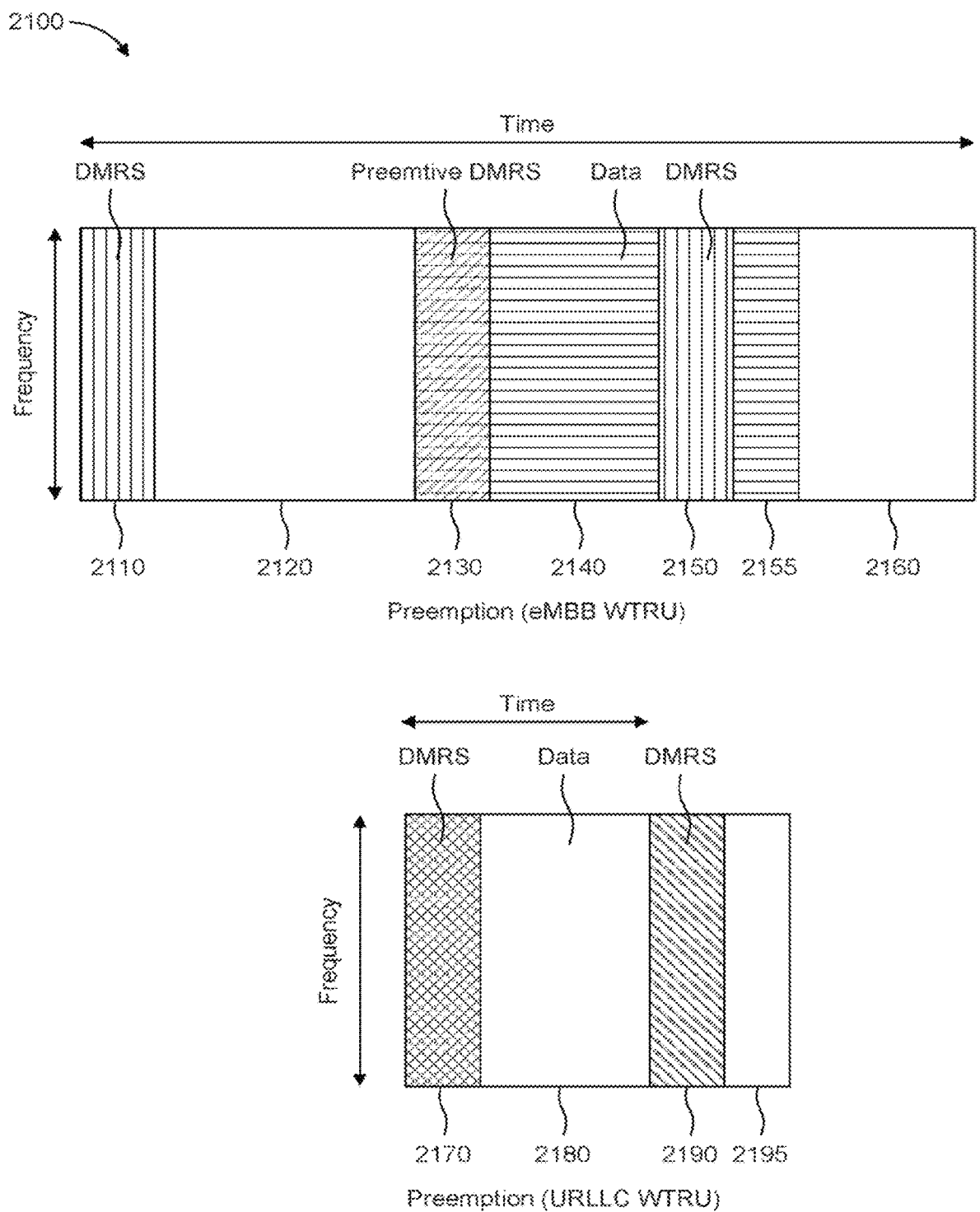
FIG. 21 is a diagram illustrating an example of eMBB transmission with interruption where an eMBB WTRU transmits preemptive demodulation reference symbol (DMRS) that is orthogonal to a URLLC transmission.

FIG. 21 is a diagram illustrating an example of eMBB transmission with interruption where the eMBB WTRU transmits preemptive DMRS that is orthogonal to a URLLC transmission. As shown in an example in diagram 2100, multiple DMRSs may be used by the eMBB WTRU and multiple DMRSs may be used by the URLLC WTRU. The eMBB WTRU may transmit a DMRS 2110. This eMBB transmission may be orthogonal to the URLLC transmission. The eMBB WTRU may use a second DMRS and the URLLC WTRU may transmit a second DMRS orthogonal to the second eMBB DMRS.

For example, the eMBB WTRU may transmit data 2120 after transmitting the DMRS 2110. Further, the eMBB WTRU may transmit a second, preemptive DMRS 2130 orthogonal to the URLLC WTRU DMRS 2170. Further, the eMBB WTRU may continue the interruption of its transmission 2140 while the URLLC WTRU transmits its data 2180. Additionally or alternatively, the eMBB WTRU may transmit data 2140 during the URLLC WTRU transmission 2180. Moreover, the eMBB WTRU may transmit another DMRS 2150 that is orthogonal to a second URLLC WTRU DMRS 2190. Also, the eMBB WTRU may continue the interruption of its transmission 2155 while the URLLC WTRU transmits its data 2195. Additionally or alternatively, the eMBB WTRU may transmit data 2155 during the URLLC WTRU transmission 2195. The eMBB WTRU may then resume transmitting its data 2060

An example URLLC WTRU procedure is as follows. The URLLC WTRU may receive a DCI instructing it to transmit at a desired resource. The DCI may include a DMRS configuration that ensures orthogonal transmission to any eMBB WTRU DMRS. The URLLC WTRU may transmit data and one or more DMRSs that use the received configuration. The data may be rate matched around all transmitted DMRS(s). The data may be punctured to accommodate any transmitted DMRS. The data may be rate matched around any URLLC DMRS and punctured to accommodate any eMBB DMRS.

An example eMBB WTRU procedure is as follows. The eMBB WTRU may be configured to monitor for a cancellation or multiplexing indication that indicates the resource to replace and possibly the parameters to use for the DMRS, or the DMRS configuration. This may be configured to occur when the WTRU is scheduled. This may be configured to occur for resources in which the WTRU may be interrupted by a URLLC WTRU, for example, a preconfigured resource for dynamic URLLC transmission, a preconfigured resource(s) for configured grant URLLC transmission, and the like. On reception of a valid multiplexing indication, the eMBB WTRU may modify its current transmission to accommodate the DMRS of the URLLC WTRU. The eMBB WTRU may interrupt its transmission to transmit a DMRS that is orthogonal to the DMRS that the URLLC WTRU can transmit. The eMBB WTRU may interrupt its transmission and not transmit any information in the DMRS resource of the URLLC WTRU. The eMBB WTRU may then resume transmission of its data.

Methods for efficient monitoring in URLLC/eMBB multiplexing are also disclosed in examples provided herein. GC-PDCCH signaling is based on a set of WTRUs decoding the PDCCH with a type of RNTI, for example an x-RNTI. This enables the WTRU to receive signaling relating to a deterministic set of WTRUs. In an example, the signaling may be group common signaling. In the case that there is inter-WTRU multiplexing of both URLLC and eMBB WTRUs, there may be a need to define methods that enable a WTRU to receive signaling, for example, group common signaling, relating to a portion of the resource grid, for example, time/frequency resources in a given bandwidth/BWP/cell. In one example, a URLLC WTRU that is transmitting using a configured grant may have pre-defined resources it needs to transmit in. As such, any WTRU that transmits in this portion of the grid may need to monitor for cancellation, power control, or a combination, of signaling when it is allocated resources in this portion of the resource grid.

In one example solution, the gNB may predefine a monitoring configuration for a particular WTRU for a set of resources. In the case of a dynamically scheduled eMBB WTRU, the gNB may include an activation signal for one or more of the configurations that need to be monitored in the scheduling DCI. In the case of a configured grant eMBB WTRU, the gNB may use WTRU specific PDCCH signaling based activation/deactivation. For Type 2 CG, this may be part of the activation/deactivation signaling used to start/stop the CG transmission or separate activation/deactivation signaling to allow for flexibility. For Type 1 CG, this may be new activation/deactivation signaling to enable it know the resources within which it modifies its behavior.

Example methods are provided herein that enable the WTRU to autonomously determine whether or not the signaling, for example, group common signaling, is applicable to one or more of its transmissions for a given period, as opposed to blindly following received signaling. In one possible scheduler strategy for large bandwidths, the network may partition the PRB grid in a number of parts, possibly as a function of target transmission rates for different WTRUs, and the like. The network may then schedule eMBB transmissions to maximize capacity while ensuring that collision in between URLLC transmissions cannot occur. In such a case, signaling could be issued to all WTRUs in a cell which would apply per partition such that the scheduler could control collision between eMBB WTRU(s) and URLLC WTRU(s), but also between power/interference levels and the like. This would factor out the unpredictable timing aspects of URLLC with respect to eMBB scheduling. For example, when the network schedules a URLLC transmission, the network may issue a common DCI pre-emption indication for the portion of the spectrum corresponding to the URLLC transmission, thus making all eMBB WTRUs adjust accordingly if and only if those WTRUs determine that they are scheduled/active in transmission for that spectrum partition.

Further, the network could configure one RNTI per partition for such DCI control information. Such control information could include a pre-emption indication for the partition at least in time, and maybe also in frequency, a power backoff for the partition at least in time, and maybe also in frequency, an indication to mute transmissions on specific resources, for example, for DM-RS of URLLC transmissions at least in time, and maybe also in frequency. In this manner, the gNB does not need to configure or reconfigure WTRUs in terms of grouping as RNTIs relate to spectrum partitions and WTRUs would autonomously decode for the proper RNTI as a function of the resources associated with a transmission, which may be a scheduled transmission, and only if the control information could change how the WTRU would perform the transmission, for example, if pre-emption could be applied, and the like.

For example, the WTRU could autonomously determine that it should decode for a given RNTI for a DCI for pre-emption indication as a function of the portion of the bandwidth in which the WTRU has a scheduled transmission, for a period during which it may expect such signaling (for example, before and/or during the transmission(s)) if the transmission is for a low priority. For example, the transmission is not an URLLC transmission.

A generalized example procedure is discussed in the following. A WTRU given behavior [A] may be a function of at least one of the following. The behavior may be a function of whether or not they have a transmission [TRx] scheduled within a period of time [x], otherwise the WTRU does not perform [A] for the period [y]. For example, the WTRU may evaluate conditions for [A] if [TRx] at least partly overlaps with [x] in time.

The behavior may be a function of the associated priority Po [for example, 0-URLLC-high priority/1-eMBB-low priority] of such transmission [TRx]. For example, the WTRU may evaluate conditions for [A] if [Po] corresponds to [1-eMBB], otherwise the WTRU does not perform [A] for the period [y], where [TRx] may be characterized by a resource allocation in time (start, and/or duration)/frequency (for example, PRBs), by a type of scheduling information [configured, or from reception of DCI], by a MCS table, by a (set of) MCS value(s), by a given power level, by a HARQ status (for example, initial, or retransmission), or a priority (for example, of the data included in the transport block).

In examples herein, [y] may correspond to at least one of the following. The [y] may correspond to a period (possibly offset time) before the start of TRx, where the offset in time may be a configuration aspect of the WTRU. The [y] may correspond to a period corresponding to the transmission duration of TRx.

The WTRU given behavior [A] may be a function where [A] may correspond to at least one of the following. For example, [A] may correspond to the WTRU determining one (or more) blind decoding parameters, including at least one of the following. For example, the WTRU may determine the RNTI(s) to monitor. For example, the WTRU may monitor a RNTI that corresponds (for example, by configuration) to a specific set of PRBs, if such set of PRB is a superset of at least some of the resources scheduled for [TRx]. Further, the WTRU may monitor the search space (SS) to monitor. For example, using the SS may be similar as above except with SS instead of RNTI. Also, the WTRU may monitor the Aggregation Level (AL) to monitor. For example, using the AL may be similar as above with AL instead of RNTI. Moreover, the WTRU may monitor the DCI format(s)/size(s) to monitor. For example, using the DCI format(s) may be similar as above with DCI format(s)/size(s) instead of RNTI. In addition, the WTRU may monitor the PDCCH monitoring occasions. For example, using the PDCCH monitoring occasions may be similar to the above with PDDCH occasions instead of RNTI.

In another example, [A] may correspond to the WTRU determining that it should apply received signaling, for example, a pre-emption notification; For example, the WTRU may apply the pre-emption if the WTRU determines that the indication corresponds to a superset of at least some of the resources scheduled for [TRx].

In a further example, [A] may correspond to the WTRU determining that it should apply a power compensation, a power reduction, or both. For example, using power may be similar as above with power compensation instead of pre-emption. Alternatively or additionally, using power may be similar as above with power reduction instead of pre-emption.

In an additional example, [A] may correspond to the WTRU determining that it should refrain from performing transmission in specific symbols/resources, for example, for DM-RS skipping. For example, using DM-RS may be similar as above with DM-RS muting instead of pre-emption.

The WTRU given behavior [A] may be a function of where the WTRU uses one or more characteristics of the such transmission to evaluate whether or not to perform behavior [A], for example, one of the following. The WTRU may use resource allocation for the transmission in frequency and/or time (for example, set of PRBs). For example, the WTRU may perform [A] if during period [y] if [TRx] may at least partially overlap with period [x] if Po corresponds to 1-eMBB. For another example, the WTRU may perform [A] if [TRx] may at least partially overlap with PRBs within a certain part of the frequency band if Po corresponds to 1-eMBB.

Further, the WTRU may use a type of grant (for example, configured of dynamic) as a characteristic. For example, the WTRU may perform [A] if during period [y] if [TRx] is scheduled by a configured grant and may at least partially overlap with period [x].

Also, the WTRU may use whether or not the transmission is the initial transmission or a retransmission. For example, the WTRU may perform [A] if during period [y] if [TRx] may at least partially overlap with period [x] if Po corresponds to 1-eMBB.

Moreover, the WTRU may use the applicable (set of) MCS. For example, the WTRU may perform [A] if during period [y] if [TRx] may at least partially overlap with period [x] if Po corresponds to 1-eMBB.

Examples solutions to avoid or reduce uplink interference may be included herein. A WTRU may follow certain procedures to prevent or reduce uplink interference. For example, the WTRU may follow procedures including at least one of: apply a power compensation or reduction to a transmission; refrain from performing a previously scheduled transmission for at least a portion of the time resources allocated for the transmission; or for specific time symbols or resources (for example DM-RS), monitor PDCCH for an indication to apply or not an interference reduction behavior, such as an indication to cancel a transmission, to confirm a transmission, or to reduce transmission power; and perform a previously scheduled transmission in an alternate resource.

The WTRU may determine whether or how to apply at least one of the above procedures during a first period as a function of at least one of the following: whether or not the WTRU has a transmission scheduled within a second period or overlapping with a second period; and/or at least one characteristic of the transmission. A characteristic of the transmission may include one or more of a priority level associated to the transmission, such as corresponding to eMBB or URLLC; a resource allocation for the transmission in frequency and/or time (for example set of PRBs); a type of grant (configured type 1, configured type 2 or dynamic); a type of physical channel (PUSCH, PUCCH, PRACH) or physical signal (SRS, DM-RS); a PUCCH format; a type of uplink control information (HARQ-ACK, SR, CSI); a scheduling type for CSI (aperiodic, periodic or semi-persistent) or SRS; whether or not the transmission is the initial transmission or a retransmission (for example, for PUSCH, SR or PRACH); and an MCS table used for the scheduling of the transmission, or an MCS used for the transmission.

In examples provided above herein, the first period may correspond to at least one of a period before the start of the transmission, where the offset in time may be a configuration aspect of the WTRU or a period corresponding to the duration of the transmission. In an example, the period may be possibly time offset.

The WTRU may monitor PDCCH for an indication according to at least one of the following. The WTRU may determine one or more parameters for decoding of PDCCH, including at least one of: at least one search space configuration including a Coreset, periodicity and offset of monitoring occasions, type, aggregation levels, set of DCI formats, and the like; and a set of RNTI(s) to monitor. Further, at least one of the above aspects may be associated with specific resources defined in time and/or frequency resources for the transmission potentially affected (for example, cancelled or transmitted with reduced power). An indication received in a specific time instance may affect a transmission overlapping in time with a period defined relative to that time instance (for example, the same slot or a subsequent slot, plus an offset). Also, a set of time and/or frequency resources may be indicated by a field of DCI of the indication. For example, the DCI may include a bitmap indicating which set of time symbols or which set of time symbols and frequency-domain portions is concerned by the indication.

For example, the WTRU may autonomously determine that it should decode for a given RNTI for a DCI for cancellation indication as a function of the portion of the bandwidth in which the WTRU has a scheduled transmission, for a period during which it may expect such signaling if the transmission is for a low priority (for example, not URLLC). In an example, the period may be before the transmission(s), the period may be during the transmission (s), or the period may be both.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising a processor configured to:
   receive, via radio resource control (RRC) signaling, an indication of a set of reference frequency resources for which uplink cancellation could occur, an indication of at least one priority for which uplink cancellation is applicable, and an allocation for a configured grant, the allocation for the configured grant comprising a frequency allocation for the configured grant, a time allocation for the configured grant, and a priority index for the configured grant;
   receive a physical downlink control channel (PDCCH) transmission, the PDCCH comprising downlink control information (DCI), the DCI comprising cancellation indication (CI) information, wherein the CI information indicates that a subset of the set of reference frequency resources is subject to uplink cancellation in one or more time symbols; and
   cancel at least part of an uplink transmission associated with the configured grant based on the CI information, the frequency allocation for the configured grant, the time allocation for the configured grant, the priority index for the configured grant, and the indication of the at least one priority for which uplink cancellation is applicable received in the RRC signaling.

2. The WTRU of claim 1, wherein the processor being configured to cancel at least part of the uplink transmission associated with the configured grant based on the CI information, the frequency allocation for the configured grant, the time allocation for the configured grant, the priority index for the configured grant, and the indication of the at least one priority for which uplink cancellation is applicable received in the RRC signaling comprises the processor being configured to:
   cancel at least part of the uplink transmission associated with the configured grant on a condition that the CI information is received, that at least one frequency resource of the subset of the set of reference frequency resources overlaps with the frequency allocation for the configured grant, that at least one time symbol of the one or more time symbols overlaps with the time allocation for the configured grant, and that the priority index for the configured grant is determined to be an applicable priority for cancelation.

3. The WTRU of claim 2, wherein the processor being configured to cancel at least part of the uplink transmission associated with the configured grant on a condition that the CI information is received, that at least one frequency resource of the subset of the set of reference frequency resources overlaps with the frequency allocation for the configured grant, that at least one time symbol of the one or more time symbols overlaps with the time allocation for the configured grant, and that the priority index for the configured grant is determined to be an applicable priority for cancelation comprises the processor being configured to:
   determine a first part of the uplink transmission associated with the configured grant that overlaps with the at least one frequency resource of the subset of the set of reference frequency resources and the at least one time symbol of the one or more time symbols, and a second part of the uplink transmission associated with the configured grant that does not overlap with the at least one frequency resource of the subset of the set of reference frequency resources and the at least one time symbol of the one or more time symbols;

cancel the first part of the uplink transmission associated with the configured grant; and transmit the second part of the uplink transmission associated with the configured grant.

4. The WTRU of claim 2, wherein the processor being configured to cancel at least part of the uplink transmission associated with the configured grant on a condition that the CI information is received, that at least one frequency resource of the subset of the set of reference frequency resources overlaps with the frequency allocation for the configured grant, that at least one time symbol of the one or more time symbols overlaps with the time allocation for the configured grant, and that the priority index for the configured grant is determined to be an applicable priority for cancelation comprises the processor being configured to:

cancel the entirety of the uplink transmission associated with the configured grant.

5. The WTRU of claim 2, wherein the priority index for the configured grant is determined to be an applicable priority for cancelation based on the indication of the at least one priority for which uplink cancellation is applicable received in the RRC signaling and a value of the priority index.

6. The WTRU of claim 5, wherein the priority index for the configured grant is determined to be an applicable priority for cancelation on a condition that the priority index for the configured grant is lower than or equal to the at least one priority for which uplink cancellation is applicable indicated in the RRC signaling.

7. The WTRU of claim 1, wherein the at least one priority for which uplink cancellation is applicable indicated in the RRC signaling comprises an applicable maximum priority.

8. The WTRU of claim 1, wherein the processor is further configured to, on a condition that the priority index for the configured grant indicates a priority higher than the at least one priority for which uplink cancellation is applicable indicated in the RRC signaling, transmit the uplink transmission.

9. The method of claim 1, wherein the uplink transmission is one of: for transmission on a physical uplink control channel (PUCCH), for transmission on a physical uplink shared channel (PUSCH), an ultra-reliable low latency (URLLC) transmission, or an enhanced massive mobile broadband (eMBB) transmission.

10. The WTRU of claim 1, wherein the processor is further configured to:

receive a second PDCCH transmission, the second PDCCH comprising second DCI, the second DCI comprising second CI information, wherein the second CI information indicates that a second subset of the set of reference frequency resources are subject to uplink cancellation in one or more second time symbols;

determine that a second uplink transmission associated with the configured grant does not overlap with the second subset of the set of reference frequency resources subject to uplink cancellation in the one or more second time symbols; and transmit the second uplink transmission associated with the configured grant based on the determination that the second uplink transmission associated with the configured grant does not overlap with the set of reference frequency resources subject to uplink cancellation in the one or more second time symbols.

11. A method implemented in a wireless transmit/receive unit (WTRU), the method comprising:

receiving, via radio resource control (RRC) signaling, an indication of a set of reference frequency resources for which uplink cancellation could occur, an indication of at least one priority for which uplink cancellation is applicable, and an allocation for a configured grant, the allocation for the configured grant comprising a frequency allocation for the configured grant, a time allocation for the configured grant, and a priority index for the configured grant;

receiving a physical downlink control channel (PDCCH) transmission, the PDCCH comprising downlink control information (DCI), the DCI comprising cancellation indication (CI) information, wherein the CI information indicates that a subset of the set of reference frequency resources is subject to uplink cancellation in one or more time symbols; and cancelling at least part of an uplink transmission associated with the configured grant based on the CI information, the frequency allocation for the configured grant, the time allocation for the configured grant, the priority index for the configured grant, and the indication of the at least one priority for which uplink cancellation is applicable received in the RRC signaling.

12. The method of claim 11, wherein cancelling at least part of the uplink transmission associated with the configured grant based on the CI information, the frequency allocation for the configured grant, the time allocation for the configured grant, the priority index for the configured grant, and the indication of the at least one priority for which uplink cancellation is applicable received in the RRC signaling comprises:

cancelling at least part of the uplink transmission associated with the configured grant on a condition that the CI information is received, that at least one frequency resource of the subset of the set of reference frequency resources overlaps with the frequency allocation for the configured grant, that at least one time symbol of the one or more time symbols overlaps with the time allocation for the configured grant, and that the priority index for the configured grant is determined to be an applicable priority for cancelation.

13. The method of claim 12, wherein cancelling at least part of the uplink transmission associated with the configured grant on a condition that the CI information is received, that at least one frequency resource of the subset of the set of reference frequency resources overlaps with the frequency allocation for the configured grant, that at least one time symbol of the one or more time symbols overlaps with the time allocation for the configured grant, and that the priority index for the configured grant is determined to be an applicable priority for cancelation comprises:

determining a first part of the uplink transmission associated with the configured grant that overlaps with the at least one frequency resource of the subset of the set of reference frequency resources and the at least one time symbol of the one or more time symbols, and a second part of the uplink transmission associated with the configured grant that does not overlap with the at least one frequency resource of the subset of the set of reference frequency resources and the at least one time symbol of the one or more time symbols;

cancelling the first part of the uplink transmission associated with the configured grant; and transmitting the second part of the uplink transmission associated with the configured grant.

14. The method of claim 12, wherein cancelling at least part of the uplink transmission associated with the configured grant on a condition that the CI information is received, that at least one frequency resource of the subset of the set of reference frequency resources overlaps with the frequency allocation for the configured grant, that at least one time symbol of the one or more time symbols overlaps with the time allocation for the configured grant, and that the priority index for the configured grant is determined to be an applicable priority for cancelation comprises:

cancelling the entirety of the uplink transmission associated with the configured grant.

15. The method of claim 12, wherein the priority index for the configured grant is determined to be an applicable priority for cancelation based on the indication of the at least one priority for which uplink cancellation is applicable received in the RRC signaling and a value of the priority index.

16. The method of claim 15, wherein the priority index for the configured grant is determined to be an applicable priority for cancelation on a condition that the priority index for the configured grant is lower than or equal to the at least one priority for which uplink cancellation is applicable indicated in the RRC signaling.

17. The method of claim 11, wherein the at least one priority for which uplink cancellation is applicable indicated in the RRC signaling comprises an applicable maximum priority.

18. The method of claim 11, further comprising, on a condition that the priority index for the configured grant indicates a priority higher than the at least one priority for which uplink cancellation is applicable indicated in the RRC signaling, transmitting the uplink transmission associated with the configured grant.

19. The method of claim 11, wherein the uplink transmission associated with the configured grant is one of: for transmission on a physical uplink control channel (PUCCH), for transmission on a physical uplink shared channel (PUSCH), an ultra-reliable low latency (URLLC) transmission, or an enhanced massive mobile broadband (eMBB) transmission.

20. The method of claim 11, further comprising:

receiving a second PDCCH transmission, the second PDCCH comprising second DCI, the second DCI comprising second CI information, wherein the second CI information indicates that a second subset of the set of reference frequency resources are subject to uplink cancellation in one or more second time symbols;

determining that a second uplink transmission associated with the configured grant does not overlap with the second subset of the set of reference frequency resources subject to uplink cancellation in the one or more second time symbols; and transmitting the second uplink transmission associated with the configured grant based on the determination that the second uplink transmission associated with the configured grant does not overlap with the set of reference frequency resources subject to uplink cancellation in the one or more second time symbols.

* * * * *